US012787096B2

(12) United States Patent
Chen et al.

(10) Patent No.: US 12,787,096 B2
(45) Date of Patent: Nov. 3, 2026

(54) METHOD AND DEVICE FOR RECEIVING AND TRANSMITTING INFORMATION

(71) Applicant: SAMSUNG ELECTRONICS CO., LTD., Suwon-si (KR)

(72) Inventors: Zhe Chen, Beijing (CN); Sa Zhang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 18/446,349

(22) Filed: Aug. 8, 2023

(65) Prior Publication Data

US 2024/0057191 A1 Feb. 15, 2024

(30) Foreign Application Priority Data

| | | |
|---|---|---|
| Aug. 10, 2022 | (CN) | 202210957910.3 |
| Oct. 26, 2022 | (CN) | 202211321414.5 |
| Nov. 9, 2022 | (CN) | 202211399955.X |
| Apr. 28, 2023 | (CN) | 202310479056.9 |

(51) Int. Cl.

| | |
|---|---|
| ***H04W 36/30*** | (2009.01) |
| ***H04W 16/28*** | (2009.01) |
| ***H04W 72/25*** | (2023.01) |
| ***H04W 76/19*** | (2018.01) |

(52) U.S. Cl.

CPC ........... *H04W 76/19* (2018.02); *H04W 16/28* (2013.01); *H04W 72/25* (2023.01)

(58) Field of Classification Search

CPC ..... H04W 76/19; H04W 16/28; H04W 72/25; H04W 74/0833; H04B 7/06964; H04B 7/15528; H04B 7/15542

See application file for complete search history.

(56) References Cited

U.S. PATENT DOCUMENTS

| | | | | |
|---|---|---|---|---|
| 2022/0053486 | A1 | 2/2022 | Abedini et al. | |
| 2022/0069893 | A1 | 3/2022 | Abedini et al. | |
| 2023/0345262 | A1 * | 10/2023 | Park | H04W 16/28 |
| 2024/0040591 | A1 * | 2/2024 | Babaei | H04W 72/25 |

(Continued)

OTHER PUBLICATIONS

International Search Report and Written Opinion of the International Searching Authority dated Nov. 20, 2023, in connection with International Application No. PCT/KR2023/011626, 12 pages.

(Continued)

*Primary Examiner* — Schquita D Goodwin

(57) ABSTRACT

The disclosure relates to a 5G or 6G communication system for supporting a higher data transmission rate. A method performed by a Network-Controlled Repeater (NCR) in a wireless communication system includes receiving, from a base station, side control information including configuration information for forwarding signals between the base station and user equipment (UE), wherein the configuration information includes information on beam indication for the forwarding to the UE. The method further includes forwarding the signals between the base station and the UE based on the information on the beam indication, in case that a random access procedure triggered by beam failure recovery, for a mobile termination (MT) of the NCR, is completed.

10 Claims, 12 Drawing Sheets

(56) References Cited

U.S. PATENT DOCUMENTS

| | | | | |
|---|---|---|---|---|
| 2025/0055524 | A1* | 2/2025 | Fujishiro | H04B 7/04013 |
| 2025/0247139 | A1* | 7/2025 | Chen | H04B 7/06952 |
| 2025/0253928 | A1* | 8/2025 | You | H04B 7/15528 |
| 2025/0294478 | A1* | 9/2025 | Ghanbarinejad | H04W 52/367 |
| 2026/0006648 | A1* | 1/2026 | Zhu | H04B 7/15528 |
| 2026/0019142 | A1* | 1/2026 | Sharma | H04B 7/0695 |
| 2026/0046846 | A1* | 2/2026 | Shim | H04W 72/0446 |
| 2026/0046968 | A1* | 2/2026 | Bergström | H04B 7/15535 |

OTHER PUBLICATIONS

Fujitsu, "NR network-controlled repeaters receive signaling of side control information," 3GPP TSG RAN WG1 #109-e, R1-2205086, e-Meeting, May 2022, 12 pages.

ZTE, "Discussion on side control information to enable NR network-controlled," 3GPP TSG RAN WG1 #109-e R1-2203237, e-Meeting, May 2022, 13 pages.

Lenovo, "Discussion on side control information for network-controlled repeater," 3GPP TSG RAN WG1 #109-e, R1-2204064, e-Meeting, May 2022, 8 pages.

* cited by examiner

METHOD AND DEVICE FOR RECEIVING AND TRANSMITTING INFORMATION

CROSS-REFERENCE TO RELATED APPLICATIONS

This application is based on and claims priority under 35 U.S.C. § 119 to Chinese Patent Application No. 202210957910.3 filed on Aug. 10, 2022, Chinese Patent Application No. 202211321414.5 filed on Oct. 26, 2022, Chinese Patent Application No. 202211399955.X filed on Nov. 9, 2022, and Chinese Patent Application No. 202310479056.9 filed on Apr. 28, 2023, in the Chinese Intellectual Property Office, the disclosure of which are incorporated by reference herein in their entirety.

BACKGROUND

1. Field

The present disclosure relates to the technical field of wireless communication, and more specifically, to a method and device for receiving and transmitting information.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), receiving-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Transmission from a base station to a user equipment (UE) is called downlink, and transmission from a UE to a base station is called uplink.

SUMMARY

A method performed by a Network-Controlled Repeater (NCR) in a wireless communication system, the method comprising: receiving, from a base station, side control information including configuration information for forwarding signals between the base station and a user equipment (UE), wherein the configuration information includes information on a beam indication for the forwarding to the UE; and forwarding the signals between the base station and the UE based on the information on the beam indication, in case that a random access procedure triggered by beam failure recovery, for a mobile termination (MT) of the NCR, is completed.

A Network-Controlled Repeater (NCR) in a wireless communication system, the NCR comprising: a transceiver; and at least one processor coupled with the transceiver and configured to: receive, from a base station, side control information including configuration information for forwarding signals between the base station and a user equipment (UE), wherein the configuration information includes information on a beam indication for the forwarding to the UE; and forward the signals between the base station and the UE based on the information on the beam indication, in case that a random access procedure triggered by beam failure recovery, for a mobile termination (MT) of the NCR, is completed.

A method performed by a base station in a wireless communication system, the method comprising: transmitting, to a Network-Controlled Repeater (NCR), side control information including configuration information for forwarding signals between the base station and a user equipment (UE), wherein the configuration information includes information on a beam indication for the forwarding to the UE, and wherein the signals between the base station and the UE is forwarded based on the information on the beam indication, in case that a random access procedure triggered by beam failure recovery, for a mobile termination (MT) of the NCR, is completed; and receiving, from the NCR, the forwarded signals.

A base station in a wireless communication system, the base station comprising: a transceiver; and at least one processor coupled with the transceiver and configured to: transmit, to a Network-Controlled Repeater (NCR), side control information including configuration information for forwarding signals between the base station and a user equipment (UE), wherein the configuration information includes information on a beam indication for the forwarding to the UE, and wherein the signals between the base station and the UE is forwarded based on the information on the beam indication, in case that a random access procedure triggered by beam failure recovery, for a mobile termination (MT) of the NCR, is completed, and receive, from the NCR, the forwarded signals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features and advantages of the present disclosure will become more apparent from the following detailed description when taken in conjunction with the accompanying drawings.

DETAILED DESCRIPTION

Figure 1:
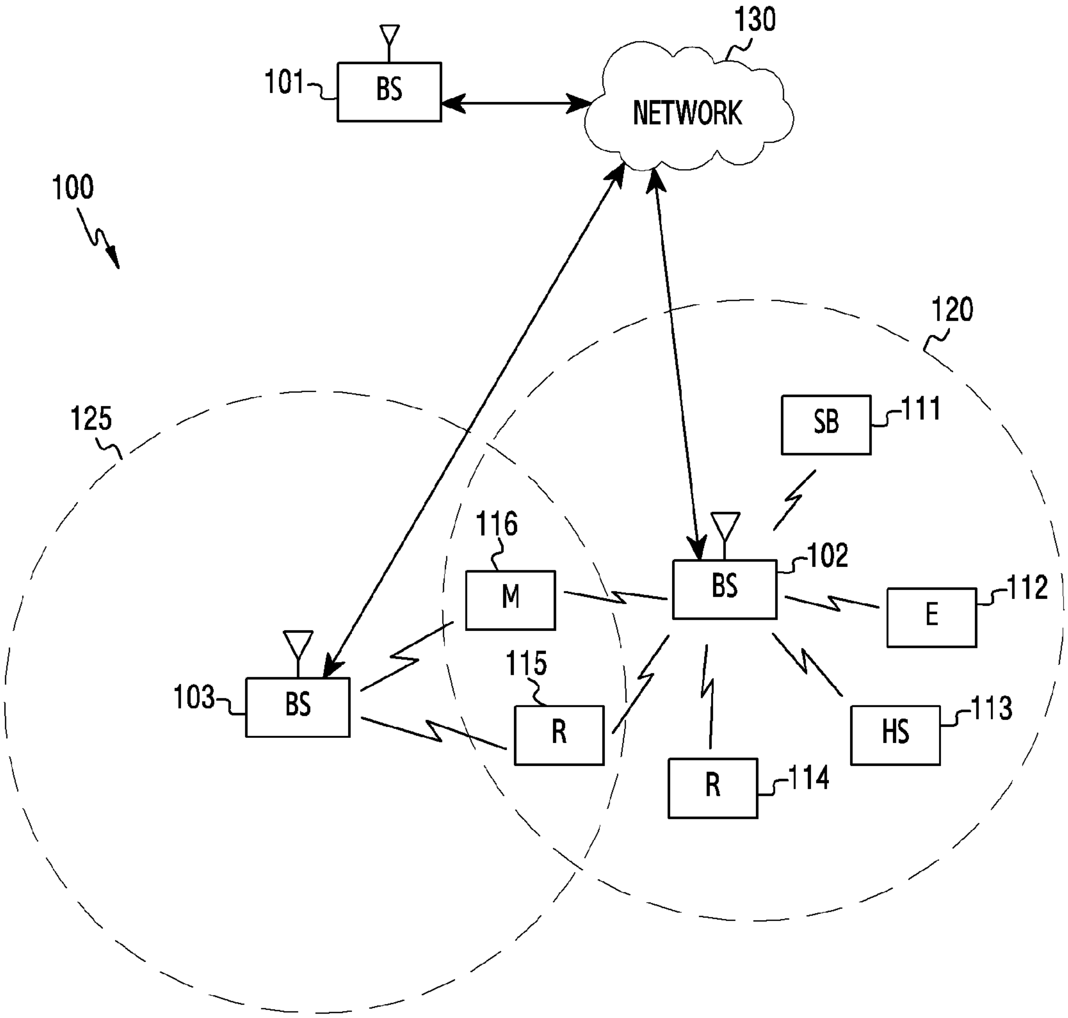
FIG. 1 illustrates an overall structure of an example wireless communication network according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to an aspect of the present disclosure, there is provided a method performed by a repeater, which includes a mobile terminal and a repeater, and the method includes: the mobile terminal performs at least one of the following behaviors: the mobile terminal determines resources based on the state of the mobile terminal, and the repeater performs reception and/or forwarding based on the resources; the mobile terminal receives information indicating the repeater to turn off, and the mobile terminal does not apply the information based on the state of the mobile terminal, wherein the state of the mobile terminal includes at least one of: the mobile terminal completing random access procedure; the mobile terminal receiving beam failure recovery BFR feedback.

In one example, the repeater performing reception and/or forwarding based on the resources comprises the repeater performing reception and/or forwarding on first time domain resources, wherein the first time domain resources includes at least one of: time domain resources for common channels and/or common signals; time domain resources after common channels and/or common signals; time domain resources for physical random access channel PRACH; time domain resources related to random access response RAR window; time domain resources related to slot format information.

In one example, the random access procedure includes at least one of the following: initial access procedure; random access procedure for beam failure recovery: random access procedure initiated by the Reconfiguration with sync procedure.

According to an aspect of the present disclosure, there is provided a method performed by a repeater, which includes a mobile terminal and a repeater, and the method includes: the mobile terminal receives a first signal and/or channel, and the mobile terminal performs at least one of the following behaviors: the repeater performs reception and/or forwarding based on resources associated with the first signal and/or channel; the mobile terminal receives information indicating the repeater to turn off, and the mobile terminal does not apply the information based on the first signal and/or channel; wherein the first signal and/or channel includes at least one of the following: beam indication information; power information; network energy saving information.

In one example, the repeater performing reception and/or forwarding based on resources associated with the first signal and/or channel includes the repeater performing reception and/or forwarding on time domain resources associated with the beam indication information.

In one example, the repeater performing reception and/or forwarding based on the resources associated with the first signal and/or channel includes the repeater performing reception and/or forwarding on the time domain resources for the reference signal associated with the power information.

In one example, the repeater performing reception and/or forwarding based on resources associated with the first signal and/or channel includes the repeater performing reception and/or forwarding on the first resources or a part of the first resources associated with the network energy saving information, and the method further includes receiving and/or transmitting signals and/or channels by the mobile terminal on the first resources.

In one example, the repeater performing reception and/or forwarding based on the resources associated with the first signal and/or channel includes the repeater performing reception and/or forwarding according to the spatial information associated with the network energy saving information, and the method further includes receiving and/or transmitting signals and/or channels by the mobile terminal according to the spatial information.

In one example, the beam indication information is carried by initial configuration signaling or initial indication signaling, and includes at least one of: beam indication information for the repeater to perform downlink reception and/or uplink forwarding; beam indication information for the repeater to perform downlink forwarding and/or uplink reception; beam indication information for indicating quasi-co-address QCL relationship; beam indication information for the repeater to perform beam sweeping.

In one example, the power information includes an amplification gain of the mobile terminal.

In one example, the network energy saving information includes at least one of the following: network state information; network mode information; network on-off information.

According to an aspect of the present disclosure, there is provided a method performed by a repeater, which includes a mobile terminal and a repeater, and the method includes: the mobile terminal performing at least one of the following behaviors: the mobile terminal determines resources based on the state of the mobile terminal, and the repeater does not perform reception and/or forwarding based on the resources; the mobile terminal receives information indicating the repeater to turn on, and the mobile terminal does not apply the information based on the state of the mobile terminal, wherein the state of the mobile terminal includes at least one of: the mobile terminal receiving beam failure recovery BFR feedback.

In one example, the random access procedure includes at least one of the following: initial access procedure; random access procedure for beam failure recovery: random access procedure initiated by the Reconfiguration with sync procedure.

According to an aspect of the present disclosure, there is provided a method performed by a repeater, which includes a mobile terminal and a repeater, and the method includes: the mobile terminal receiving a first signal and/or channel; the mobile terminal performing at least one of the following behaviors: the repeater does not perform reception and/or forwarding based on the resources associated with the first signal and/or channel; the mobile terminal receives information indicating the repeater to turn on, and the mobile terminal does not apply the information based on the first signal and/or channel, wherein the first signal and/or channel includes at least one of: beam indication information; power information; network energy saving information.

In one example, the repeater not performing reception and/or forwarding based on the resources associated with the first signal and/or channel includes the repeater not performing reception and/or forwarding on the time domain resources associated with the beam indication information.

In one example, the repeater not performing reception and/or forwarding based on the resources associated with the first signal and/or channel includes the repeater not performing reception and/or forwarding on the time domain resources for the reference signal associated with the power information.

In one example, the repeater not performing reception and/or forwarding based on the resources associated with the first signal and/or channel includes the repeater not performing reception and/or forwarding on the first resources or a part of the first resources associated with the network energy saving information, and the method further includes the mobile terminal not receiving and/or transmitting a signal and/or channel on the first resources.

In one example, the repeater not performing reception and/or forwarding based on the resources associated with the first signal and/or channel includes that the repeater not performing reception and/or forwarding according to the spatial information associated with the network energy saving information, and the method further includes the mobile terminal not receiving and/or transmitting a signal and/or channel according to the spatial information.

In one example, the beam indication information is carried by initial configuration signaling or initial indication signaling, and includes at least one of the following: beam indication information for the mobile terminal to receive signals and/or channels; beam indication information for the repeater to perform downlink reception and/or uplink forwarding; beam indication information for the repeater to perform downlink forwarding and/or uplink reception; beam indication information for indicating quasi-co-address QCL relationship; beam indication information for the repeater to perform beam sweeping.

In one example, the power information includes an amplification gain of the mobile terminal.

In one example, the network energy saving information includes at least one of the following: network state information; network mode information; network on-off information.

According to an aspect of the present disclosure, there is provided a method performed by a base station, including: transmitting indication signaling to a repeater, wherein the indication signaling is used for the repeater to perform reception and/or forwarding and includes at least one of: beam failure recovery BFR feedback; beam indication information; power information; network energy saving information.

According to an aspect of the present disclosure, there is provided a repeater, which includes a mobile terminal and a repeater, and the mobile terminal is configured to perform the above method which can be performed by the terminal device.

According to an aspect of the present disclosure, there is provided a repeater including a transceiver; and a controller coupled with the transceiver and configured to perform the above method which can be performed by the terminal device.

According to an aspect of the present disclosure, there is provided a base station including a transceiver; and a controller coupled with the transceiver and configured to perform the above-mentioned method which can be performed by the controller.

The present disclosure provides a method and device for receiving and transmitting information/signals, which can improve the performance of a network-controlled repeater (NCR).

Hereinafter, embodiments of the present disclosure will be described in detail with reference to the accompanying drawings. It should be noted that in the drawings, the same or similar elements are denoted by the same or similar reference numerals as much as possible. In addition, detailed descriptions of known functions or configurations that may make the subject matter of the present disclosure unclear will be omitted.

When describing the embodiments of the present disclosure, descriptions related to technical contents that are well known in the field and not directly related to the present disclosure will be omitted. Such unnecessary description is omitted to prevent the main idea of the present disclosure from being blurred and to convey the main idea more clearly.

For the same reason, some elements may be exaggerated, omitted or schematically shown in the drawings. In addition, the size of each component does not fully reflect the actual size. In the drawings, the same or corresponding elements have the same reference numerals.

Advantages and features of the present disclosure and ways to achieve them will become clear by referring to the embodiments described in detail below in conjunction with the accompanying drawings. However, the present disclosure is not limited to the embodiments set forth below, but can be realized in various forms. The following examples are provided only to fully disclose this disclosure and to inform those skilled in the art of its scope, and this disclosure is only limited by the scope of the appended claims. Throughout this specification, the same or similar reference numerals indicate the same or similar elements.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
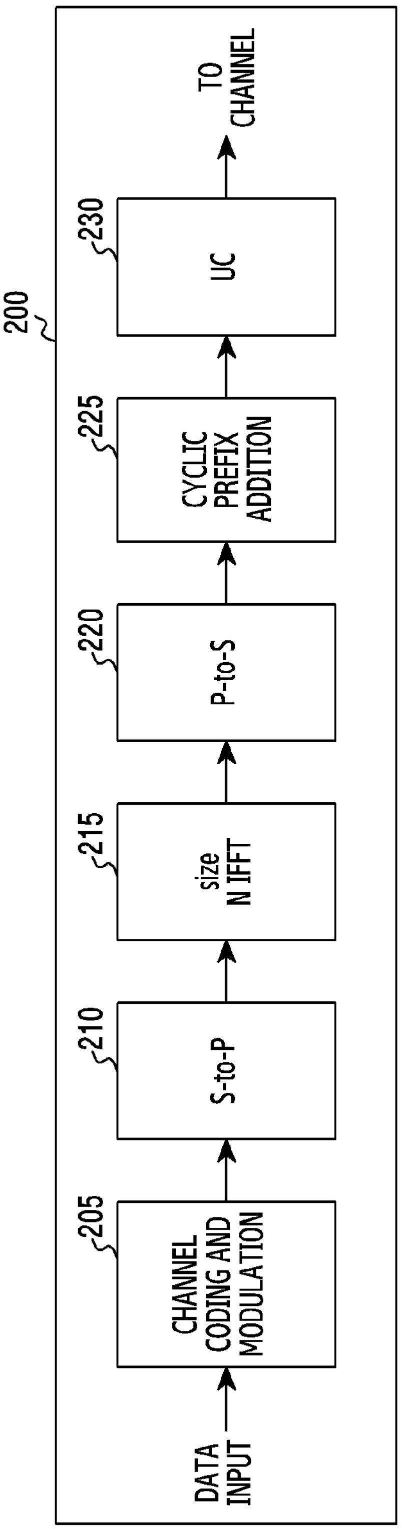
FIGS. 2*a* and 2*b* respectively illustrate a transmission path 200 and a receiving path 250 in a wireless communication network according to various embodiments of the present disclosure.
Figure 2B:
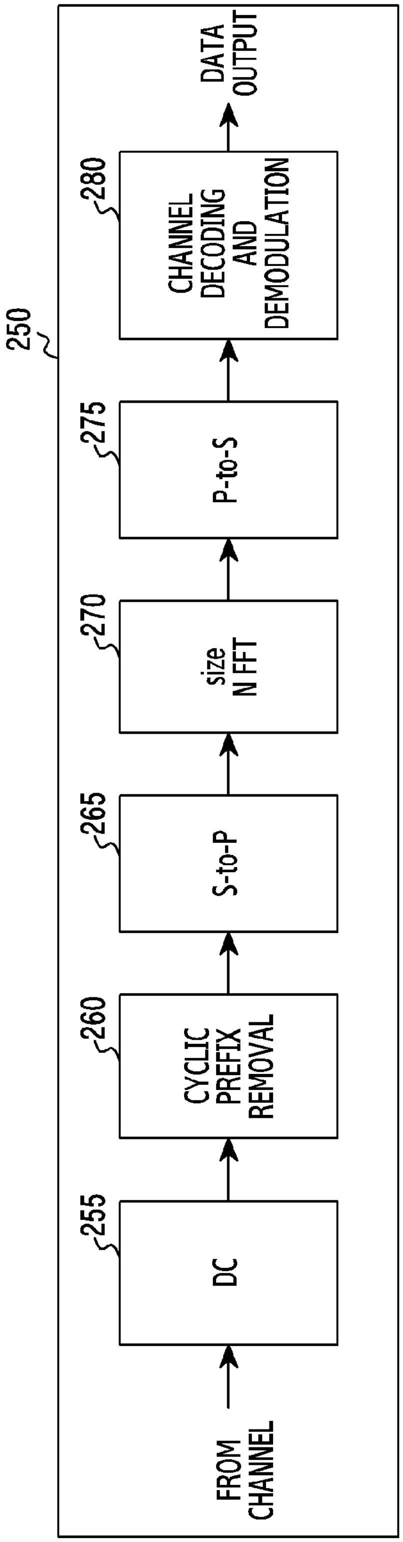

FIGS. 2*a* and 2*b* illustrate example wireless transmission and receiving paths according to the present disclosure. In the following description, the transmission path 200 can be described as being implemented in a gNB, such as gNB 102, and the receiving path 250 can be described as being implemented in a UE, such as UE 116. However, it should be understood that the receiving path 250 can be implemented in a gNB and the transmission path 200 can be implemented in a UE. In some embodiments, the receiving path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The receiving path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before on-off to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a receiving path 250 similar to that for receiving from UEs 111-116 in the uplink. Similarly, each of UEs 111-116 may implement a transmission path 200 for transmitting to gNBs 101-103 in the uplink, and may implement a receiving path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and receiving paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and receiving paths that can be used in a wireless network. Any other suitable architecture can be used to support wireless communication in a wireless network.

Figure 3A:
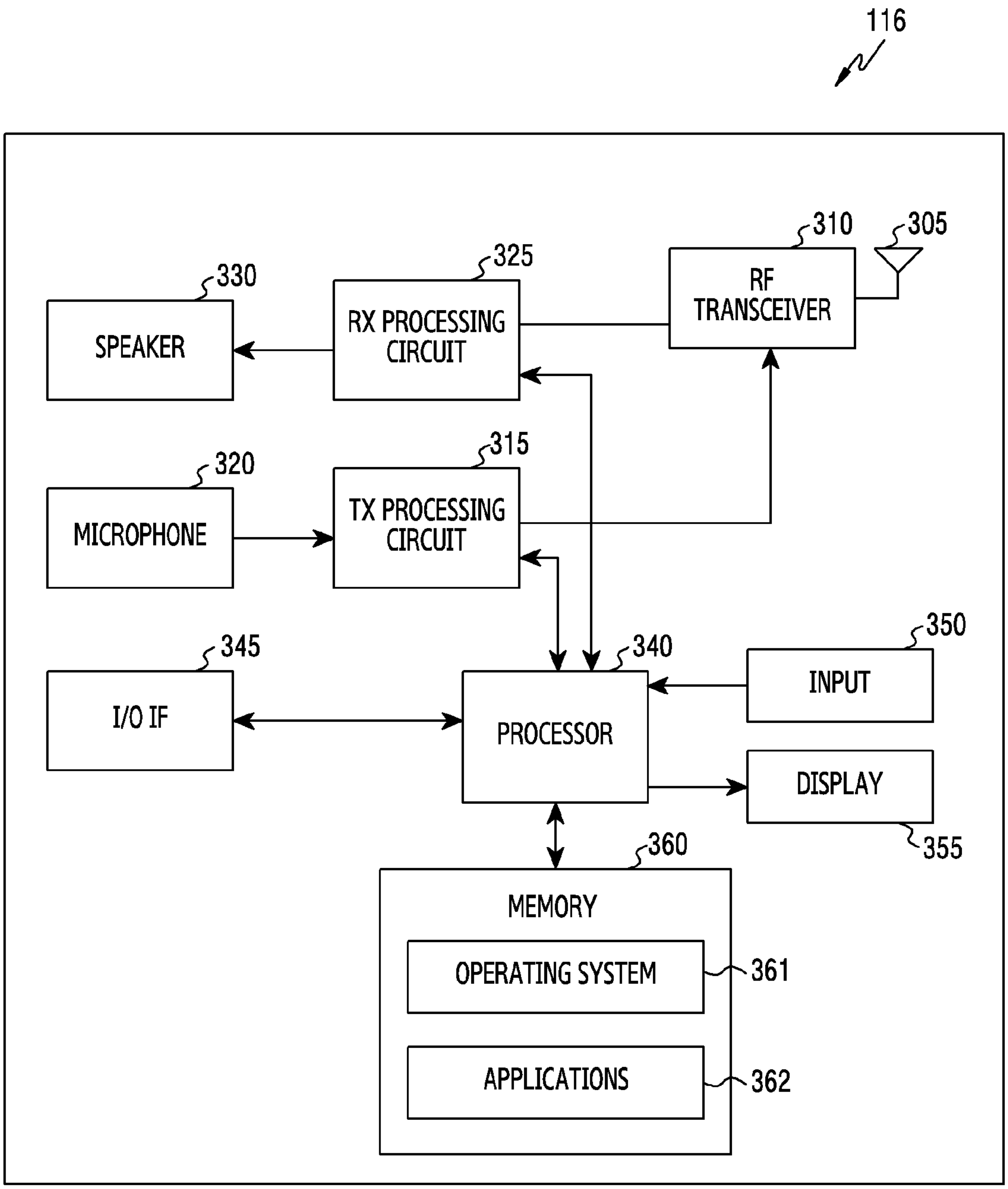
FIGS. 3*a* and 3*b* respectively illustrate the structures of a user equipment (UE) and a base station in a wireless communication network according to various embodiments of the present disclosure.

FIG. 3*a* illustrates an example UE 116 according to the present disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a receiving (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the receiving of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the capability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
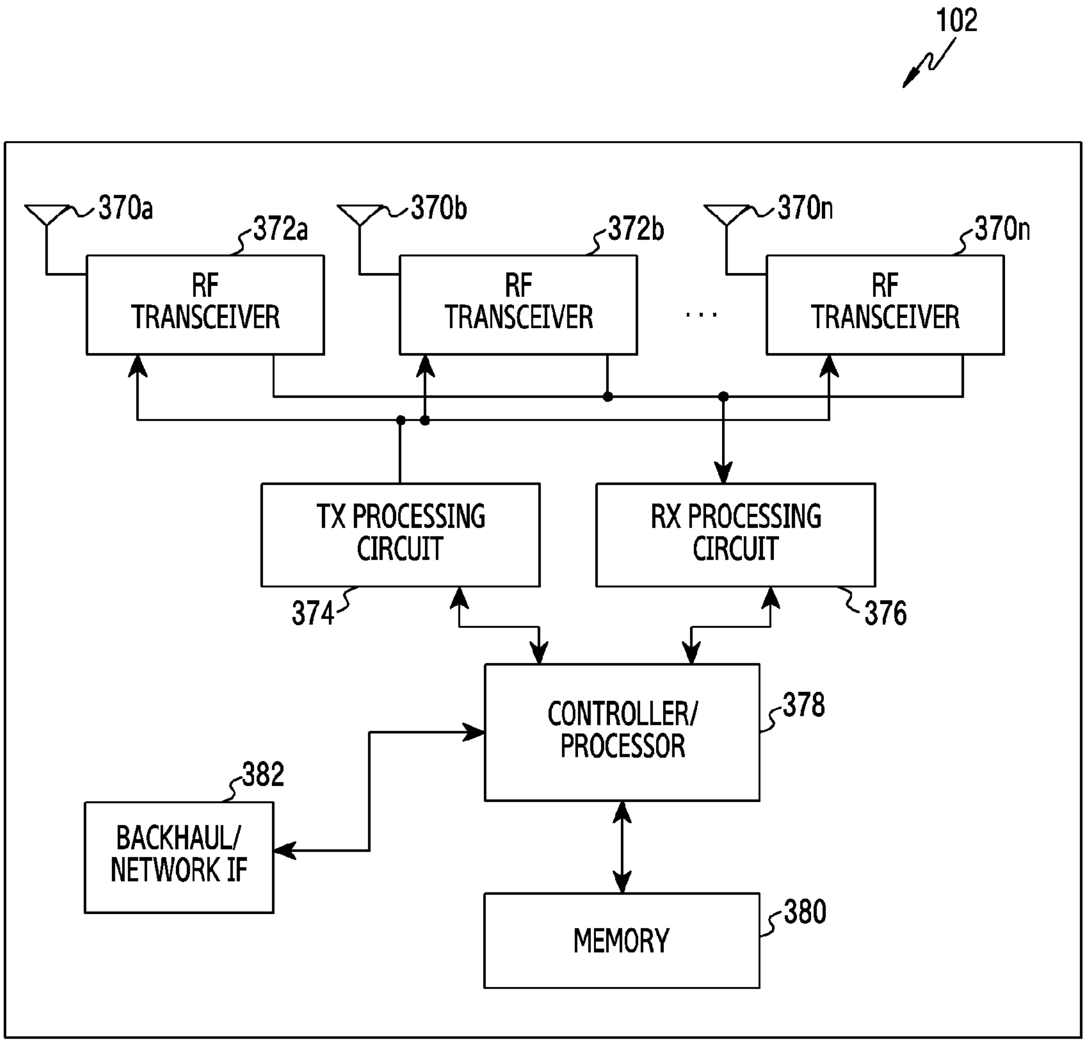

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that gNB 101 and gNB 103 can include the same or similar structures as gNB 102.

As shown in FIG. 3*b*, gNB 102 includes a plurality of antennas **370*a*-370*n*, a plurality of RF transceivers 372*a*-372*n*, a transmission (TX) processing circuit 374, and a receiving (RX) processing circuit 376. In certain embodiments, one or more of the plurality of antennas 370*a*-370*n* include a 2D antenna array. gNB 102 also includes a controller/processor 378, a memory 380, and a backhaul or network interface 382**.

RF transceivers **372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378** for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers **372*a*-372*n* receive the outgoing processed baseband or IF signal from TX processing circuit 374 and up-convert the baseband or IF signal into an RF signal transmitted via antennas 370*a*-370*n***.

The controller/processor 378 can include one or more processors or other processing devices that control the overall operation of gNB 102. For example, the controller/processor 378 can control the receiving of forward channel signals and the transmission of backward channel signals through the RF transceivers **372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378** includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of indications, such as the BIS algorithm, are stored in the memory. The plurality of indications are configured to cause the controller/processor 378 to execute the BIS process and decode the received signal after subtracting at least one interference signal determined by the BIS algorithm.

As will be described in more detail below, the transmission and receiving paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
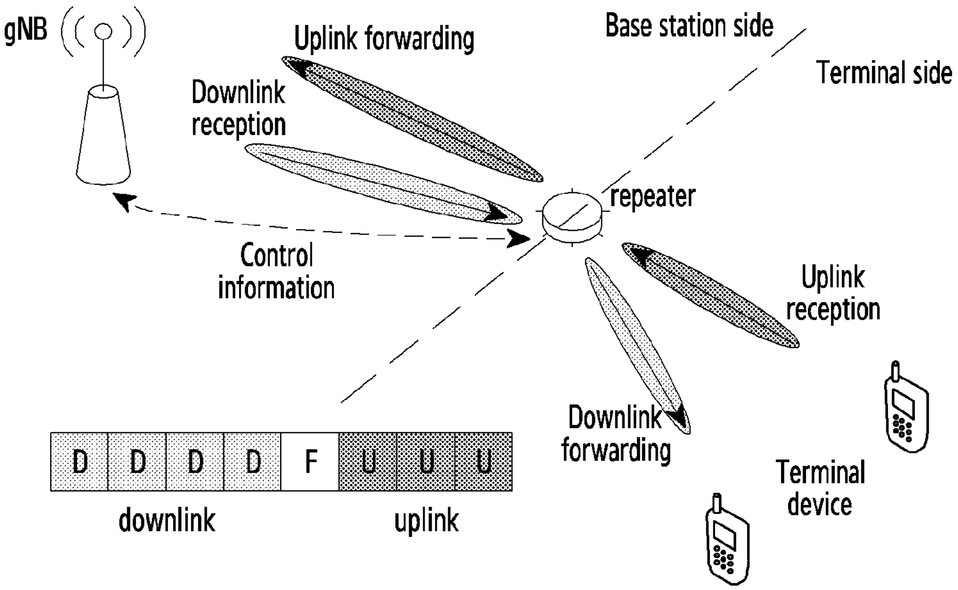
FIG. 4 illustrates an example network including an NCR according to various embodiments of the present disclosure.

In order to enhance the coverage of the 5G wireless communication system, one method is to set up a repeater at the edge of the cell (or the area with poor cell signal coverage). Generally speaking, a repeater is usually divided into two sides, a base station side and a terminal side. FIG. 4 illustrates an example network including an NCR according to various embodiments of the present disclosure. As shown in FIG. 4, for the downlink of the base station, the repeater receives radio frequency (RF) signals from the base station. These RF signals pass through the built-in amplifier in the repeater and the amplified signals are transmitted to the terminal equipment at the terminal side of the repeater. For the uplink of the base station, the repeater receives the radio frequency (RF) signals from the terminal equipment at the terminal side. These RF signals pass through the built-in amplifier in the repeater and the amplified signals are transmitted to the base station at the base station side of the repeater.

Generally, the existing repeater cannot be controlled by the base station. That is, the on/off of the repeater, the timing of uplink and downlink forwarding and the direction of uplink and downlink forwarding are all achieved through the technique implemented by the repeater itself/in a way of manual setting adjustment, which is not beneficial to the flexibility of network distribution and the coverage of the repeater. In order to overcome the above shortcomings, one solution is to integrate a terminal device for the repeater, which can communicate with network devices (e.g., base stations) in order to flexibly control the repeater. This kind of repeater integrated with a terminal equipment is called network-controlled repeater, the NCR.

Figure 5:
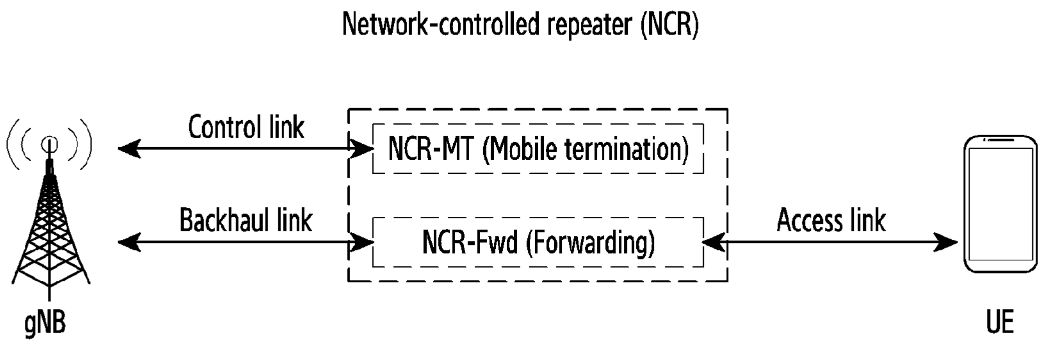
FIG. 5 illustrates an example structure of an NCR according to various embodiments of the present disclosure.

FIG. 5 illustrates an example structure of an NCR according to various embodiments of the present disclosure. As shown in FIG. 5, an NCR has two functional entities: the first unit and the second unit. It can be understood that in this disclosure, the repeater (NCR) and its naming are only exemplary and not limited. Particularly, in this disclosure, take the network-controlled repeater mobile terminal (NCR-MT) as an example of the first unit, and take the network-controlled repeater forwarder/forwarding (NCR-Fwd) as an example of the second unit, in which:

NCR-MT is defined as a functional entity for information exchange (for example, side control information) with a base station. Here, the link between an NCR-MT and the base station is called control link (C-link). In addition, the side control information is at least used to control the NCR-Fwd.

NCR-Fwd is defined as a functional entity for amplifying and forwarding radio frequency signals (e.g., uplink/downlink radio frequency signals) between a base station and a UE. The link between NCR-Fwd and the base station is called a backhaul link; the link between the NCR-Fwd and a UE is called an access link.

In this disclosure, an NCR can refer to NCR-MT or the NCR-Fwd, or a combination of both. Optionally, an NCR-MT can also be equivalently understood as a UE, that is, it can be equivalently understood as a terminal equipment (UE).

In order to avoid ambiguity, corresponding names are defined here for the transmission and reception behavior of a repeater. Referring back to FIG. 4, for an NCR, or for an NCR-Fwd, radio frequency signal receiving for downlink (or radio frequency signal receiving at the base station side; or radio frequency signal receiving on the backhaul link) is called downlink reception; radio frequency signal transmission for downlink (or, radio frequency signal transmission at the terminal side; or, radio frequency signal forwarding to the terminal; or radio frequency signal transmission on the access link) is called downlink forwarding; radio frequency signal receiving for uplink (or radio frequency signal receiving at the terminal side; or radio frequency signal receiving on an access link) is called uplink reception; radio frequency signal transmission for uplink (or radio frequency signal transmission at the base station side; or, radio frequency signal forwarding to the base station; or radio frequency signal transmission on the backhaul link) is called uplink forwarding.

At present, there is no indication/determination method for on/off of the NCR-Fwd, so the forwarding efficiency of the NCR needs to be improved.

In order to solve the above problems, this disclosure proposes a number of methods for indicating/determining the on or off of the NCR-Fwd. These methods can help the NCR-Fwd to turn on or off on appropriate resources, thus improving the forwarding efficiency of the NCR and the performance of communication system. This will be described in detail by the following embodiments and examples.

Embodiment 1 (indicating NCR-Fwd to turn on, power adjustment and/or space domain adjustment)

Figure 6:
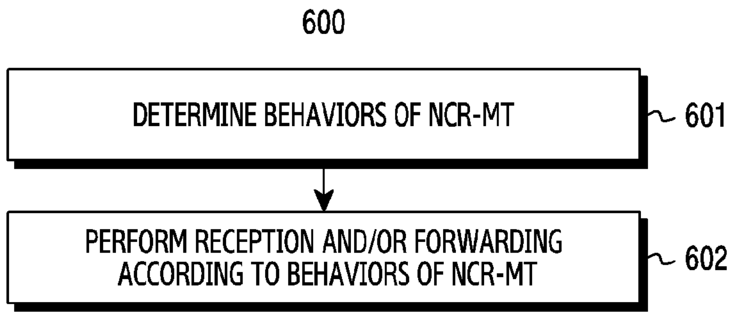
FIG. 6 illustrates a method 600 performed by an NCR according to various embodiments of the present disclosure.

FIG. 6 illustrates a method 600 performed by an NCR according to various embodiments of the present disclosure. As shown in FIG. 6, at 601, the NCR-MT determines the state of the NCR-MT (which can be understood as the NCR-MT determining the behavior of the NCR-MT); at 602, the NCR-Fwd performs reception and/or forwarding according to the state (or behavior) of the NCR-MT.

The method includes that NCR-Fwd performs reception and/or forwarding, or the NCR does not apply information indicating the off of NCR-Fwd, when the NCR satisfies at least one of the following conditions: the NCR-MT is in radio resources control (RRC) connected state; the NCR-MT completes random access procedure; the NCR-MT receives beam failure recovery (BFR) feedback; the NCR-MT receives beam indication information; the NCR-MT receives first slot format information; the NCR-MT receives power information; the NCR-MT receives network energy saving information.

Here, the NCR-Fwd performing reception and/or forwarding can be understood as that the NCR-Fwd is turned on, or that the NCR-Fwd is in on state. It can also be understood that the NCR does not apply the information indicating the off of NCR-Fwd, which can be understood as that the NCR-Fwd does not use/apply the information indicating that the NCR-Fwd does not perform reception and/or forwarding. Optionally, reception and/or forwarding refers to at least one of the following: downlink reception and/or downlink forwarding; uplink reception and/or uplink forwarding.

The above conditions and the behaviors for NCR are described in the following examples.

Example 1 (Entering or being in RRC Connected State or Completing Random Access Procedure)

When NCR-MT is in or enters RRC connected state, or after the NCR-MT completes random access procedure, the NCR-Fwd performs reception and/or forwarding transmits on time domain resources, or the NCR does not apply information indicating the off of NCR-Fwd; wherein, the time domain resources refer to at least one of the following: time domain resources related to a channel and/or signal; time domain resources related to slot format information.

Optionally, random access procedure refers to at least one of the following: initial access procedure; contention-based random access procedure; contention-free random access procedure; random access procedure for beam failure recovery; random access procedure initiated by the reconfiguration with sync procedure.

Optionally, the NCR does not apply the information indicating the off of NCR-Fwd when the above conditions are satisfied. In other words, the NCR (or the NCR-Fwd) does not apply or use information indicating that the NCR-Fwd does not perform reception and/or forwarding. Optionally, the information refers to the periodic off information of the NCR-Fwd (in other words, information indicating not to perform reception and/or forwarding on the periodic time domain resources of the NCR-Fwd).

Optionally, when the above conditions are satisfied, the NCR (or the NCR-Fwd) is on in the time domain resources (or performs at least one of downlink reception, downlink forwarding, downlink reception and uplink forwarding on the time domain resources). The time domain resources are further described below. For the convenience of understanding, the above time domain resources are divided into two parts for discussion: the first time domain resources for downlink transmission and the second time domain resources for uplink transmission. That is, the NCR-Fwd performs downlink reception and/or downlink forwarding on the first time domain resources when the above conditions are satisfied. Optionally, when the above conditions are satisfied, the NCR-Fwd performs uplink reception and/or uplink forwarding on the second time domain resources.

Optionally, the first time domain resources refer to at least one of the following: the time domain resources of the channel and/or signal (for example, the time unit to/in which the channel and/or signal are related or located); time domain resources corresponding to slot format information (for example, time units related to or corresponding to the slot format information). Optionally, the channel and/or signal refers to at least one of a reference signal, a common channel, a common signal, a broadcast signal and a broadcast channel. Optionally, the time domain resources of the channel and/or signal refer to at least one of the following:

- time domain resources of a reference signal (for example, at least one of synchronization signal block (SSB), channel state information reference signal (CSI-RS) and sounding reference signal (SRS)).

Optionally, the reference signal refers to the reference signal identified by the NCR-MT during random access procedure. For example, the reference signal refers to the SSB identified by the NCR-MT during random access procedure.

Optionally, the reference signal refers to a reference signal related to the control resource set #0 (CORESET #0). Optionally, the reference signal is a reference signal for identifying the typeD QCL parameter corresponding to the CORESET #0. For example, the reference signal is SSB used to identify the typeD QCL parameter corresponding to the CORESET #0.

- time domain resources of a common channel (e.g., common physical downlink control channel (PDCCH))

For example, the time domain resources of the common PDCCH refer to the time domain resources (e.g., corresponding slots and/or symbols) corresponding to the common search space (CSS) of Type 0 PDCCH. Optionally, the CSS is configured through pdcchConfigSIB1.

For example, the time domain resources of the common PDCCH refer to the time domain resources (e.g., corresponding slots and/or symbols) corresponding to Type 0A-PDCCH CSS. Optionally, the CSS is configured through searchSpaceOtherSystemInformation in the PDCCH-ConfigCommon.

For example, the time domain resources of the common PDCCH refer to the time domain resources (e.g., corresponding slots and/or symbols) corresponding to the Type 1 PDCCH (Type 1-PDC) CSS. Optionally, the CSS is configured through ra-SearchSpace in the PDCCH-ConfigCommon.

For example, the time domain resources of the common PDCCH refer to the time domain resources (e.g., corresponding slots and/or symbols) corresponding to the Type 2 PDCCH (Type 2-PDC) CSS. Optionally, the CSS is configured through pagingSearchSpace in the PDCCH-ConfigCommon.

For example, the time domain resources of the common PDCCH refer to the time domain resources (e.g., corresponding slots and/or symbols) corresponding to Type0B-PDCCH CSS.

For example, the time domain resources of the common PDCCH refer to the time domain resources (e.g., corresponding slots and/or symbols) corresponding to the Type 1A-PDCCH CSS.

For example, the time domain resources of the common PDCCH refer to the time domain resources (e.g., corresponding slots and/or symbols) corresponding to Type 2A-PDCCH CSS.

time domain resources after a common signal or a common channel (e.g., a common PDCCH) (e.g., N time units after the time unit where the common PDCCH is located. Specifically, please refer to the above for the specific explanation of common PDCCH.)

For example, N=1, 2, . . . Taking the common PDCCH being Type 1-PDCCH CSS as an example, the NCR-Fwd is turned on (in other words, performs downlink reception and/or downlink forwarding) in N slots after the slot where Type 1-PDCCH CSS is located. The reason is that the physical downlink shared channel (PDCCH) scheduled by the common PDCCH may appear in N slots after the slot where the common PDCCH is located. If the NCR is turned on at this time, and the UE served by the NCR can receive the PDSCH.

Optionally, the turning on (or performing reception and/or forwarding) on the time domain resources of the NCR-Fwd after the common PDCCH should meet the following conditions: the multiplexing pattern of SSB and CORESET is multiplexing pattern 2.

time domain resources related to random access response (RAR) window

For example, symbols and/or slots corresponding to the RAR window. Optionally, the starting point of the RAR window is related to the physical random access channel (PRACH) occasion associated with the SSB (for example, the starting point of the RAR window is after the PRACH occasion associated with the SSB). Optionally, the starting point of the RAR window is determined by the time domain resources (e.g., slots or symbols) where the Type 1-PDCCH CSS is located. Optionally, the RAR window is configured through the ra-Response window. Specifically, the length unit of the RAR window is a slot, and the corresponding subcarrier spacing (SCS) of the slot is based on the SCS used for the Type 1-PDCCH CSS set. The advantage of this method is that the NCR-MT can obtain the related information of RAR window through system information, and the terminal equipment also uses such RAR window information. The NCR-Fwd is turned on on the time domain resources related to the RAR window, so that the terminal equipment served by the NCR can receive the RAR.

Optionally, the above time domain resources corresponding to slot format information refer to downlink time domain resources. Optionally, the downlink time domain resources are identified according to a time division duplex (TDD) configuration parameter (for example, a common TDD configuration parameter tdd-UL-DL-ConfigurationCommon). Specifically, the downlink resources refer to downlink symbols or downlink slots identified according to TDD configuration parameters.

Optionally, the above description of time domain resources of a signal and/or channel can be combined with the description of downlink time domain resources. Taking the time domain resources of common PDCCH as an example, the time domain resources of common PDCCH can be understood as downlink time domain resources among the time domain resources related to common PDCCH. Specifically, the time domain resources related to the common PDCCH refer to the downlink symbols in the slots where the common PDCCH is located.

Optionally, the second time domain resources refer to at least one of the following: the time domain resources of a channel and/or signal (e.g., the time units in which the channel and/or signal are related/located); time domain resources corresponding to slot format information (e.g., time units related/corresponding to the slot format information). Optionally, the channel and/or signal refers to a reference signal, a common channel or a common signal. Optionally, the time domain resources of the channel and/or signal refers to at least one of the following:

time domain resources of a reference signal (e.g., sounding reference signal SRS)

time domain resources after a common signal or channel (e.g., common PDCCH) (e.g., M time units after the time units where the common PDCCH is located). See above for the specific explanation of common PDCCH.)

For example, M=1, 2, . . . Taking the common PDCCH being Type 1-PDCCH CSS as an example, the NCR-Fwd is turned on (in other words, performs uplink reception and/or uplink forwarding) in M slots after the slots where Type 1-PDCCH CSS is located. The advantage of this method is that the PDSCH scheduled by the common PDCCH may correspond to the physical uplink control channel (PUCCH) (used for HARQ feedback) or message 3 (msg3) (that is, the PDSCH contains scheduling information for msg3). These uplink signals will appear after the slots in which the common PDCCH is located. When, the NCR is turned on at this time, the base station (gNB) can receive these uplink signals sent by the UE served by the NCR.

time domain resources of PRACH time domain resources of a PRACH occasion (for example, symbols and/or slots where the PRACH occasion is located). Optionally, the PRACH occasion is associated with SSB. Optionally, the PRACH occasion refers to all PRACH occasions associated with SSB. Optionally, the time domain resources of the PRACH refer to the union of time domain resources (e.g., slots or symbols) of all PRACH occasions associated with SSB. Optionally, the SSB refers to the SSB identified by the NCR-MT during random access procedure. Optionally, the SSB refers to the SSB related to CORESET #0. Optionally, the ID corresponding to the SSB is indicated by the base station (for example, the base station indication is carried by dedicated signaling;

another example is that the SSB indicated by the base station is used for access link beam sweeping).

time domain resources related to RAR window (or time domain resources after RAR window)

For example, symbols and/or slots corresponding to the RAR window. Optionally, the starting point of the RAR window is determined through the time domain resources (e.g., slots or symbols) where the Type 1-PDCCH CSS is located. Optionally, the RAR window is configured through the ra-Response window. Specifically, the length unit of RAR window is a slot, and the SCS corresponding to such slot is based on SCS for Type 1-PDCCH CSS set.

Optionally, the time domain resources described above refer to uplink time domain resources (or time domain resources corresponding to the slot format information). Optionally, the uplink time domain resources are determined by a TDD configuration parameter (for example, a common TDD configuration parameter tdd-UL-DL-Configuration-Common). Optionally, the uplink time domain resources refer to uplink symbols or uplink slots determined by a TDD configuration parameter.

Optionally, the above description of time domain resources of a signal and/or channel can be combined with the description of uplink time domain resources. Taking the time domain resources of common PDCCH as an example, the time domain resources of common PDCCH can be understood as uplink time domain resources among the time domain resources related to common PDCCH. Specifically, the time domain resources related to the common PDCCH can be understood as uplink symbols in the slot where the common PDCCH is located.

Example 2 (BFR Feedback)

When the NCR-MT receives BFR feedback, the NCR-Fwd performs reception and/or forwarding on time domain resources, or the NCR does not apply the information indicating the off of the NCR-Fwd; wherein, the time domain resources refer to at least one of the following: time domain resources related to a channel and/or signal; time domain resources related to slot format information.

Here, after the NCR-MT receives BFR feedback can be understood as a period of time (for example, 28 symbols) after the NCR-MT receives BFR feedback. Specifically, BFR feedback refers to PDCCH. Optionally, the PDCCH refers to at least one of the following: cyclic redundancy check (CRC) for downlink control information (DCI) format corresponding to the PDCCH is scrambled by cell radio network temporary identifier (C-RNTI) or modulation and coding solution cell radio network temporary identifier (MCS-C-RNTI); the PDCCH is received in the recovery-SearchSpaceId; the PDCCH is used to determine the completion of the contention based random access procedure; the DCI format corresponding to the PDCCH schedules a PUSCH transmission with a same HARQ process number as for the transmission of the first PUSCH and having a toggled NDI field value (for example, the first PUSCH carries a BFR media access control control element (MAC CE)).

Optionally, the NCR does not apply the information indicating the off of NCR-Fwd when the above conditions are satisfied. In other words, the NCR (or the NCR-Fwd) does not apply or use information indicating that the NCR-Fwd does not perform reception and/or forwarding. Optionally, the information refers to the periodic off information of the NCR-Fwd (in other words, information indicating not performing reception and/or forwarding on the periodic time domain resources for the NCR-Fwd).

Optionally, in case that the above conditions are satisfied, the NCR (or the NCR-Fwd) is turned on over the time domain resources (or performs at least one of downlink reception, downlink forwarding, downlink reception and downlink forwarding on the time domain resources). The time domain resources are further described below. For the convenience of understanding, the above time domain resources are divided into two parts: the first time domain resources for downlink transmission and the second time domain resources for uplink transmission. The NCR-Fwd performs downlink reception and/or downlink forwarding on the first time domain resources when the above conditions are satisfied. Optionally, when the above conditions are satisfied, the NCR-Fwd performs uplink reception and/or uplink forwarding on the second time domain resources.

Optionally, the first time domain resources refer to at least one of the following: the time domain resources of a channel and/or signal (for example, the time unitd to/in which the channel and/or signal is related/located); time domain resources corresponding to slot format information (e.g., time units related/corresponding to the slot format information). Optionally, the channel and/or signal refers to at least one of a reference signal, a common channel, a common signal, a broadcast signal and a broadcast channel. Optionally, see Example 1 for the explanation of the time domain resources of a channel and/or signal. Optionally, the time domain resources of the channel and/or signal refer to at least one of the following:

time domain resources of a reference signal (for example, at least one of SSB, CSI-RS and SRS).

Optionally, the reference signal is a reference signal (for example, q0) reported by the NCR-MT to the base station. Optionally, the reference signal is selected from first reference signals, wherein the first reference signals refer to reference signals identifying the candidate beams for recovery. For example, the time domain resources for the reference signal refer to the time domain resources of SSB corresponding to q0. That is, the NCR-Fwd performs downlink reception and/or downlink forwarding on the time domain resources of SSB corresponding to q0.

Optionally, the time domain resources corresponding to the slot format information refer to downlink time domain resources. Optionally, the downlink time domain resources are determined by a TDD configuration parameter (for example, a common TDD configuration parameter tdd-UL-DL-ConfigurationCommon). Optionally, the downlink resources refer to downlink symbols/downlink slots determined by the TDD configuration parameter.

Optionally, the above description of time domain resources of a signal and/or channel can be combined with the description of downlink time domain resources. Taking the time domain resources of a reference signal reported by the NCR-MT to the base station as an example, the time domain resources for the reference signal reported by the NCR-MT to the base station can be understood as downlink time domain resources on the time domain resources for the reference signal reported by the NCR-MT to the base station. Specifically, the time domain resources for the reference signal reported by the NCR-MT to the base station can be understood as the downlink symbols in the slots where the reference signal reported by the NCR-MT to the base station is located.

Optionally, the explanation of the second time domain resources is the same as that in Example 1.

Example 3 (Beam Indication Information)

When the NCR-MT receives the beam indication information, the NCR-Fwd performs reception and/or forwarding on the time domain resources related to the beam indication information, or the NCR does not apply the information indicating the off of NCR-Fwd.

Optionally, the signaling carrying the beam indication information may be one of DCI, MAC-CE and RRC. Optionally, the signaling carrying the beam indication information is initial configuration signaling or initial indication signaling. Optionally, the beam indication information refers to at least one of the following: reference signal indication information, TCI indication information or beam ID indication information. Optionally, the beam indication information refers to at least one of the following:

Beam indication information for the NCR-Fwd of the NCR to perform downlink reception and/or uplink forwarding;

Optionally, the beam indication information is at least one of transmission configuration indication (TCI) identification (ID), reference signal ID and sounding reference signal (SRS) resource indication (SRI). The reference signal refers to at least one of SSB, CSI-RS and SRS.

Beam indication information for the NCR-Fwd of the NCR to perform downlink forwarding and/or uplink reception;

Optionally, the beam indication information is at least one of TCI ID, reference signal ID, SRI or beam ID. The reference signal refers to at least one of SSB, CSI-RS and SRS.

Beam indication information for indicating quasi-co-location (QCL) relationship;

Optionally, the beam indication information indicates one or more reference signals (for example, SSB and/or CSI-RS). Wherein the one or more reference signals have the same QCL assumption; in other words, the NCR-MT determines that the one or more reference signals are QCLed.

Optionally, the beam indication information indicates one or more reference signals (for example, SSB and/or CSI-RS). Wherein at least one of the one or more reference signals and the first reference signal have the same QCL assumption; in other words, the NCR-MT determines that at least one of the one or more reference signals and the first reference signal are QCLed.

Optionally, the first reference signal is SSB; wherein, the SSB is related to CORESET #0. For example, the SSB was identified by the NCR-MT during random access procedure. As another example, the SSB is indicated by the MAC-CE from the base station. For another example, the SSB is identified by the NCR-MT in the beam failure recovery procedure (in other words, the link recovery procedure).

Indication information for NCR-Fwd beam sweeping of the NCR;

Optionally, the NCR-Fwd beam sweeping refers to UE side beam sweeping.

Optionally, the NCR-Fwd beam sweeping refers to the beam sweeping for the access link.

Optionally, the beam indication information indicates one or more reference signals; wherein, the one or more reference signals are used for the NCR-Fwd beam sweeping.

After the NCR-MT receives the beam indication information, can be understood as a period of time (for example, 28 symbols) after the NCR-MT receives the beam indication information.

Optionally, the NCR does not apply the information indicating the off of the NCR-Fwd when the above conditions are satisfied. In other words, the NCR (or the NCR-Fwd) does not apply or use information indicating that the NCR-Fwd does not perform reception and/or forwarding. Optionally, the information indicating the off of the NCR-Fwd is related to the above beam indication information. Optionally, the information refers to the periodic off information of the NCR-Fwd (in other words, information indicating not to perform reception and/or forwarding on the periodic time domain resources of the NCR-Fwd). For example, the NCR-Fwd receives periodic off information related to a reference signal or beam, and after the NCR-MT receives information indicating the reference signal or beam, the NCR-Fwd does not apply the periodic off information related to the reference signal or beam.

Optionally, the NCR-Fwd performs reception and/or forwarding on the time domain resources corresponding to the beam indication information in case that the above conditions are satisfied. It can be understood that the NCR-Fwd performs reception and/or forwarding on the time domain resources for the reference signal indicated by the beam indication information. Optionally, the time domain resources for the reference signal refer to at least one of the following: the time unit where the reference signal is located; the time units before the time units where the reference signal is located; the time units after the time units where the reference signal is located.

Before the NCR-MT receives the beam indication information, the NCR-Fwd performs reception and/or forwarding on the time domain resources according to the default configuration; wherein, the time domain resources refer to one of the following: time domain resources related to a channel and/or signal; time domain resources related to slot format information. Here, the previous description in this example can be referred to for the explanation of the beam indication information. In addition, see Example 1 for the explanation of time domain resources.

Example 4 (Slot Format Information)

After the NCR receives the first slot format information, the NCR-Fwd performs reception and/or forwarding on the time domain resources corresponding to the second slot format information, or the NCR does not apply the information indicating the off of NCR-Fwd. The second slot format information refers to at least one of the following: dedicated slot format configuration information; common slot format information.

Here, after the NCR receives the first slot format information, can be understood as a period of time (for example, 3 ms) after the NCR receives the first slot format information. Optionally, the first slot format information refers to dedicated slot format configuration information (e.g., tdd-UL-DL-ConfigurationDedicated).

Optionally, under the above conditions, the NCR does not apply the information indicating the off of NCR-Fwd. In other words, the NCR (or the NCR-Fwd) does not apply or use information indicating that the NCR-Fwd does not perform reception and/or forwarding. Optionally, the information indicating the off of NCR-Fwd is related to the first slot format information. Optionally, the information refers to the periodic off information of the NCR-Fwd (in other words, information indicating not to perform reception and/or forwarding on the periodic time domain resources of the NCR-Fwd). For example, the NCR-Fwd does not apply NCR-Fwd off information on time domain resources corresponding to the first slot format information (for example, time domain resources corresponding to uplink symbols and/or downlink symbols). Optionally, under the above conditions, the NCR-Fwd performs reception and/or forwarding on the time domain resources corresponding to the second slot format information. Wherein the second slot format information refers to at least one of the following: dedicated slot format configuration information; common slot format information.

Optionally, the common slot format information refers to common TDD configuration information (for example, tdd-UL-DL-ConfigurationCommon).

Optionally, the common slot format information refers to the slot format indication (SFI) information carried by DCI format 2_0.

Here, the time domain resources corresponding to the second slot format information can be understood as at least one of the following:

- time domain resources corresponding to the downlink symbols and/or the downlink slots corresponding to the second slot format information.

Optionally, the NCR-Fwd performs downlink reception and/or downlink forwarding on the time domain resources.

Optionally, the NCR-Fwd is turned on (in an on state) on the time domain resources.

- time domain resources corresponding to the uplink symbols and/or the uplink slots corresponding to the second slot format information.

Optionally, the NCR-Fwd performs uplink reception and/or uplink forwarding on the time domain resources.

Optionally, the NCR-Fwd is turned on (in an on state) on the time domain resources.

Example 5 (Power Information)

After the NCR-MT receives the power information, the NCR-Fwd performs reception and/or forwarding on the time domain resources related to the power information, or the NCR does not apply the information indicating the off of NCR-Fwd.

Optionally, the time domain resources related to the power information refers to the time domain resources for the reference signal related to the power information.

Optionally, the power information refers to the amplification gain, for example, the amplification gain of the NCR-Fwd.

Optionally, the power information is related to a reference signal. Optionally, the power information refers to the amplification gain adopted (or used) by the NCR-Fwd when using the spatial filter related to the reference signal.

Optionally, the reference signal refers to one or more reference signals.

Optionally, the NCR not applying the information indicating the off of NCR-Fwd, means that the NCR (or the NCR-Fwd) not applying or using the information indicating that the NCR-Fwd does not perform reception and/or forwarding. Optionally, the information refers to the periodic off information of the NCR-Fwd (in other words, information indicating not to perform reception and/or forwarding on the periodic time domain resources of the NCR-Fwd).

Example 6 (Network Energy Saving Information, Time Domain)

NCR-MT receives network energy saving information. Here, the network can be understood as a network device. Optionally, the network energy saving information refers to at least one of the following:

Network State Information

Optionally, the information indicates the state of the network, for example, on state, off state, normal state, sleep state.

Network Mode Information

Optionally, the information indicates the mode in which the network is in, for example, on mode, off mode, normal mode, sleep mode.

Network On-Off Information

Optionally, the information indicates the on-off situation of the network, for example, on, off.

The NCR-Fwd performs reception and/or forwarding on the first resources or a part of the first resources related to the network energy saving information, or the NCR does not apply the information indicating the off of NCR-Fwd. Optionally, the NCR not applying the information indicating the off of NCR-Fwd, means that the NCR does not apply the information indicating the off of NCR-Fwd on the first resources or a part of the first resources. Optionally, the information that the NCR-Fwd is turned off refers to the periodic off information of the NCR-Fwd (in other words, information indicating not to perform reception and/or forwarding on the periodic time domain resources of the NCR-Fwd).

Here, the first resources related to the network energy saving information refers to the time domain resources related to the network energy saving information. Taking the network energy saving information being normal mode or sleep mode as an example, the first time domain resources are the time domain resources in normal mode (in other words, the network device is in normal mode on the first time domain resources); the second time domain resources are time domain resources in sleep mode (in other words, the network device is in sleep mode on the second time domain resources). Optionally, the NCR-Fwd performing reception and/or forwarding on first time domain resources or a part of the first time domain resources means at least one of the following: the NCR-Fwd performs reception and/or forwarding downlink on first time domain resources or a part of the first time domain resources; the NCR-Fwd performs uplink reception and/or uplink forwarding on first time domain resources or a part of the first time domain resources.

Optionally, network energy saving information can be divided into uplink network energy saving information and downlink network energy saving information. Taking the network energy saving information being normal mode or sleep mode as an example, the normal mode can be further divided into: downlink normal mode and uplink normal mode; The sleep mode can be further divided into downlink sleep mode and uplink sleep mode. Optionally, the first uplink time domain resources are time domain resources in the uplink normal mode (in other words, the network device is in the uplink normal mode on the first uplink time domain resources). Optionally, the first downlink time domain resources are time domain resources in the downlink normal mode (in other words, the network device is in the downlink normal mode on the first downlink time domain resources). Optionally, the second uplink time domain resources are time domain resources in the uplink sleep mode (in other words, the network device is in the uplink sleep mode on the second uplink time domain resources). Optionally, the second downlink time domain resources are time domain resources in the downlink sleep mode (in other words, the network device is in the downlink sleep mode on the second downlink time domain resources). Optionally, the NCR-Fwd performing reception and/or forwarding on first time domain resources or a part of the first time domain resources means at least one of the following: the NCR-Fwd performs reception and/or forwarding downlink on first downlink time domain resources or a part of the first downlink time domain resources; the NCR-Fwd performs uplink reception and/or uplink forwarding on first uplink time domain resources or a part of the first uplink time domain resources.

Optionally, the NCR-MT receives and/or transmits a signal and/or channel on the first time resources.

Optionally, the NCR-MT receives a signal and/or channel on the first downlink time resources.

Optionally, the NCR-MT transmits a signal and/or a channel on the first uplink time resources.

Optionally, the signal and/or channel refers to at least one of PDSCH, PDCCH, CSI-RS, SSB, PUSCH, PUCCH, SRS and PRACH.

Optionally, the signal and/or channel is periodic.

Optionally, the signal and/or channel is semi-persistent.

Example 7 (Network Energy Saving Information, Frequency Domain)

NCR-MT receives network energy saving information. Here, the network can be understood as a network device. See Example 6 for the explanation of network energy saving information.

The NCR-Fwd performs reception and/or forwarding on the first resources or a part of the first resources related to the network energy saving information, or the NCR does not apply the information indicating the off of NCR-Fwd. Optionally, the NCR not applying the information indicating the off of NCR-Fwd, means that the NCR does not apply the information indicating the off of NCR-Fwd on the first resources or a part of the first resources. Optionally, the information that the NCR-Fwd is turned off refers to the periodic off information of the NCR-Fwd (in other words, information indicating not to perform reception and/or forwarding on the periodic time domain resources of the NCR-Fwd).

Here, the first resources related to the network energy saving information refer to the frequency domain resources related to the network energy saving information. Taking the network energy saving information being normal mode or sleep mode as an example, the first frequency domain resources are the frequency domain resources in normal mode (in other words, the network device is in normal mode on the first frequency domain resources); the second frequency domain resources are the frequency domain resources in the sleep mode (in other words, the network device is in the sleep mode on the second frequency domain resources). Optionally, the NCR-Fwd performing reception and/or forwarding on the first frequency domain resources or a part of the first frequency domain resources means at least one of the following: the NCR-Fwd performs reception and/or forwarding downlink on the first frequency domain resources or a part of the first frequency domain resources; the NCR-Fwd performs uplink reception and/or uplink forwarding on the first frequency domain resources or a part of the first frequency domain resources.

Optionally, network energy saving information can be divided into uplink network energy saving information and downlink network energy saving information. Taking the network energy saving information being normal mode or sleep mode as an example, the normal mode can be further divided into: downlink normal mode and uplink normal mode; the sleep mode can be further divided into downlink sleep mode and uplink sleep mode. Optionally, the third frequency domain resources are frequency domain resources in the uplink normal mode (in other words, the network device is in the uplink normal mode on the third frequency domain resources). Optionally, the fourth frequency domain resources are frequency domain resources in the downlink normal mode (in other words, the network device is in the downlink normal mode on the fourth frequency domain resources). Optionally, the fifth frequency domain resources are frequency domain resources in the uplink sleep mode (in other words, the network device is in the uplink sleep mode on the fifth frequency domain resources). Optionally, the sixth frequency domain resources are frequency domain resources in the downlink sleep mode (in other words, the network device is in the downlink sleep mode on the sixth frequency domain resources). Optionally, the NCR-Fwd performing reception and/or forwarding on frequency domain resources means at least one of the following: the NCR-Fwd performs reception and/or forwarding uplink on third frequency domain resources or a part of the third frequency domain resources; the NCR-Fwd performs downlink reception and/or downlink forwarding on fourth frequency domain resources or a part of the fourth frequency domain resources.

Optionally, the NCR-MT receives and/or transmits a signal and/or channel on the first frequency domain resources.

Optionally, the NCR-MT receives a signal and/or channel on fourth frequency domain resources.

Optionally, the NCR-MT transmits a signal and/or channel on the third frequency domain resources.

Optionally, the frequency domain resources refer to at least one of RB, RB group, BWP, CC, cell, subband, frequency band and frequency range.

Optionally, the signal and/or channel refers to at least one of PDSCH, PDCCH, CSI-RS, SSB, PUSCH, PUCCH, SRS and PRACH.

Optionally, the signal and/or channel is periodic.

Optionally, the signal and/or channel is semi-persistent.

Example 8 (Network Energy Saving Information, Power)

The NCR-MT receives network energy saving information. Here, the network can be understood as a network device. See Example 6 for the explanation of network energy saving information.

The NCR-Fwd performs reception and/or forwarding according to the power information related to the network energy saving information. It should be understood that the power information related to the network energy saving information described here is different from the power information received by the NCR-MT described in Example 5 above. Optionally, the power information related to network energy saving information described in Example 8 is power information for the NCR-MT, while the power information received by the NCR-MT described in Example 5 is power information for the NCR-Fwd. Optionally, the power information refers to information related to energy per resource element (EPRE). Optionally, the power information refers to power information related to a reference signal (for example, SSB, CSI-RS, DM-RS). For example, the power information of SSB, or the power information used for the NCR-MT to determine SSB EPRE. Another example is the power information of CSI-RS, or the power information used for the NCR-MT to determine CSI-RS EPRE. Another example is the power information of CSI-RS, or the power information used for the NCR-MT to determine PDSCH/PDCCH demodulation reference signal (DMRS) EPRE. Optionally, the power information of a reference signal is determined by the power offset between reference signals. For example, the power information of SSB is indicated by the base station, and the base station indicates the power offset (e.g., EPRE offset) between CSI-RS and SSB, then NCR-MT obtains the power information (e.g., EPRE information) of CSI-RS according to the above information.

Optionally, the power information related to network energy saving refers to the power information used/applied for time domain resources related to the network energy saving information. Optionally, the time domain resources can be seconds, milliseconds, frames, subframes, slots, sub-slots, symbols, etc. Taking the network energy saving information being normal mode or sleep mode as an example, the first time domain resources are the time domain resources in normal mode (in other words, the network device is in normal mode on the first time domain resources), and the corresponding power information is first power information. The second time domain resources are the time domain resources in sleep mode (in other words, the network device is in sleep mode on the second time domain resources), and the corresponding power information is second power information. Optionally, the NCR-Fwd performs reception and/or forwarding the power information on second time domain resources or a part of the second time domain resources. Optionally, the NCR-Fwd performing reception and/or forwarding according to the power information means that the NCR-Fwd determines the amplification gain of the NCR-Fwd according to the power relationship (e.g. power offset) corresponding to the first power information and the second power information, and uses the amplification gain to perform reception and/or forwarding. For example, take the power information being power of SSB as an example. According to the indication of the base station, the corresponding power of SSB on the first time domain resources is 33 dBm; the corresponding power of SSB on the second time domain resources is 30 dBm. Optionally, the gain of the NCR-Fwd on the first time domain resources is 10 dB. In this case, the gain of the NCR-Fwd on the second time domain resources is determined according to the above information. That is to say, the gain of the NCR-Fwd on the second time domain resources is 10 dB+(33 dBm−30 dBm)=13 dB. In this example, the corresponding downlink power of the base station on the second time domain resources are lower than that on the first time domain resources, so accordingly, the NCR-Fwd adjusts the downlink amplification gain accordingly, so that the received power at the UE side is unchanged.

Optionally, the power information related to network energy saving refers to the power information used/applied for frequency domain resources related to the network energy saving information. Optionally, the frequency domain resources may be frequency ranges, frequency bands, cells, component carriers (CCs), bandwidth parts (BWPs), etc. Taking the network energy saving information being normal mode or sleep mode as an example, the first frequency domain resources are the frequency domain resources in normal mode (in other words, the network device is in normal mode on the first time domain resources), and the corresponding power information is first power information. The second frequency domain resources are the frequency domain resources in sleep mode (in other words, the network device is in sleep mode on the second time domain resources), and the corresponding power information is second power information. Optionally, the NCR-Fwd performs reception and/or forwarding the power information on the second frequency domain resources or a part of the second frequency domain resources. Optionally, the NCR-Fwd performing reception and/or forwarding according to the power information means that the NCR-Fwd determines the amplification gain of the NCR-Fwd according to the power relationship (e.g. power offset) corresponding to the first power information and the second power information, and uses the amplification gain to perform reception and/or forwarding. For example, take power information being power of SSB as an example. According to the indication of the base station, the corresponding power of SSB resources on the first frequency domain resources is 33 dBm; the power of SSB on the second frequency domain resources is 30 dBm. Optionally, the gain of the NCR-Fwd on the first frequency domain resources is 10 dB. In this case, the gain of the NCR-Fwd on the second frequency domain resources is determined according to the above information. That is to say, the gain of the NCR-Fwd on the second frequency domain resources is 10 dB+(33 dBm−30 dBm)=13 dB. In this example, the downlink power of the base station on the second frequency domain resources is lower than that on the first frequency domain resources, so accordingly, the NCR-Fwd adjusts the downlink amplification gain accordingly, so that the received power at the UE side is unchanged.

Optionally, the power information related to network energy saving refers to the power information used/applied for the space domain resources related to the network energy saving information. Optionally, spatial resources refer to reference signal resources, or time domain resources related to the reference signals.

Optionally, the NCR-MT receives and/or transmits a signal and/or channel on time domain resources according to corresponding power information.

Optionally, the NCR-MT receives and/or transmits a signal and/or channel on frequency domain resources according to corresponding power information.

Optionally, the NCR-MT receives and/or transmits a signal and/or channel according to corresponding power information on spatial resources.

Example 9 (Network Energy Saving Information, Spatial Domain Information)

NCR-MT receives network energy saving information. Here, the network can be understood as a network device. See Example 6 for the explanation of network energy saving information.

The NCR-Fwd performs reception and/or forwarding according to the spatial information related to the network energy saving information, or the NCR does not apply the information indicating the off of NCR-Fwd. Taking space domain information being reference signal information as an example, the NCR receives network energy saving information, which indicates that a reference signal is in on state (reference signal (RS) is on) or transmitted. After receiving the network energy saving information, the NCR does not apply the turn-off indication of the NCR-Fwd related to the reference signal. Optionally, the turn-off indication of the NCR-Fwd related to the reference signal refers to the indication that the NCR-Fwd does not perform reception and/or forwarding on the time domain resources related to the reference signal. Optionally, the time domain resources related to the reference signal refer to the time domain resources where the reference signal is located. Optionally, the information indicating the off of NCR-Fwd is related to space domain information. Optionally, the information indicating the off of NCR-Fwd refers to the periodic off information of the NCR-Fwd (in other words, the information indicating that the NCR-Fwd does not perform reception and/or forwarding on the periodic time domain resources). Here, the spatial information can be understood as reference signal information, antenna port information, antenna panel information, transmission and receiving point (TRP) information, etc.

Optionally, the spatial information related to the network energy saving information refers to the spatial information corresponding to the time domain resources related to the network energy saving information. Taking the network energy saving information being normal mode or sleep mode as an example, the first time domain resources are the time domain resources in normal mode (in other words, the network device is in normal mode on the first time domain resources), corresponds to the first space domain information. The second time domain resources are the time domain resources in sleep mode (in other words, the network device is in sleep mode on the second time domain resources), corresponds to the second spatial information. Here, the second spatial information is understood as a beam or reference signal turned on over the second time domain resources (for example, the reference signals on the second time domain resources are a subset of the reference signals turned on over the first time domain resources).

Optionally, the NCR-Fwd determines a spatial filter for downlink reception and/or uplink forwarding according to the second spatial information. Optionally, the NCR-Fwd determines a spatial filter for downlink reception and/or uplink forwarding on second time domain resources according to the second spatial information.

Optionally, the NCR determines a spatial filter for uplink reception and/or downlink forwarding according to the second spatial information. Optionally, the NCR determines a spatial filter for downlink reception and/or uplink forwarding on second time domain resources according to the second spatial information.

Optionally, the NCR-Fwd determines a reference signal according to the second spatial information; wherein, the NCR-Fwd performs reception and/or forwarding on the time domain resources related to the reference signal. Optionally, the NCR determines a second reference signal according to the second spatial information; wherein, the NCR-Fwd performs reception and/or forwarding on the time domain resources related to the second reference signal. Taking spatial information being reference signal information (or SSB information) as an example, the NCR obtains SSB information (for example, SSB #0, SSB #1, SSB #2, SSB #3) from the base station. This SSB information can be understood as UE-side beam indication for the NCR-Fwd. In other words, the NCR-Fwd uses the same QCL assumption to receive these SSBs. In other words, such SSB information indicate the NCR-Fwd to perform downlink reception and/or downlink forwarding on the time domain resources corresponding to these SSBs. In addition, the NCR also receives second space domain information, which corresponds to second SSB information (for example, SSB #0, SSB #2, SSB #4, SSB #6). That is, the base station turns on SSB #0, SSB #2, SSB #4 and SSB #6 on the second time domain resources. Optionally, the NCR-Fwd performs downlink reception and/or downlink forwarding on the time domain resources corresponding to SSBs determined according to the intersection (SSB #0, SSB #2) of SSB information (SSB #0, SSB #1, SSB #2, SSB #3) and second SSB information (SSB #0, SSB #2, SSB #4, SSB #6). Optionally, the NCR-Fwd performs uplink reception and/or uplink forwarding on the time domain resources related to the PRACH occasions associated with the above SSB intersection (SSB #0, SSB #2).

Optionally, the NCR-MT receives and/or transmits a signal and/or channel according to spatial information. Taking spatial information being reference signal information as an example, the NCR-MT receives and/or transmits a signal and/or channel according to the reference signal information. Optionally, the signal and/or channel is related to reference signal information. For example, the reference signal corresponds to reference signal information. For another example, the reference signal corresponding to the reference signal information is QCLed with the signal and/or channel.

Advantageous effects of Embodiment 1: Embodiment 1 provides a method for the NCR-Fwd to perform reception and/or forwarding or not to perform NCR-Fwd off indication. The method can indicate the NCR-Fwd to perform reception and/or forwarding, and/or indicate the time domain resources/amplification gain/spatial information (spatial filter) used by the NCR-Fwd during the reception and/or forwarding, so that the base station can control the NCR-Fwd to turn on and the amplification gain and/or spatial filter used after the turn on, and prevent the NCR-Fwd from communicating with the UE at an inappropriate time (for example, when gNB communicates with the UE), thereby improving the receiving and forwarding performance of the NCR-Fwd, and further improving the performance of the communication system.

Embodiment 1A

NCR-MT receives first indication from a base station, the first indication corresponds to/indicates one or more time domain resources.

Optionally, the signaling corresponding to the first indication is MAC-CE or RRC.

Optionally, the one or more time domain resources are in one-to-one correspondence with the on-off information. For example, each of the above mentioned time domain resources corresponds to an on-off indication. Optionally, the indication is used to indicate whether the NCR-Fwd is turned on or off on the corresponding time domain resources (in other words, whether it is in on or off state). Optionally, if (one of) the one or more time domain resources has no corresponding beam ID or on-off indication, the NCR determines that the NCR is in the on state or off state on the corresponding time domain resources.

Optionally, the NCR-Fwd does not perform forwarding on the one or more time domain resources. It can be understood that when the NCR-Fwd is in the off state, the NCR-Fwd does not perform forwarding on the one or more time domain resources.

Optionally, the one or more time domain resources correspond to a beam ID.

Optionally, the one or more time domain resources are in one-to-one correspondence with one or more beam IDs.

Optionally, the NCR-Fwd applies corresponding beam indication (or beam ID) on the one or more time domain resources. In other words, the NCR-Fwd uses the corresponding beam ID (related spatial filter) for uplink reception and/or downlink forwarding on the corresponding time domain resources according to the first indication.

Optionally, when the beam ID corresponds to a specific value, the NCR-Fwd does not perform forwarding on the corresponding time domain resources (in other words, in off state). Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station. Optionally, the specific value is applicable to the case where the NCR-Fwd does not support access link beam indication. Optionally, the specific value applies to FR1.

Optionally, when the beam ID corresponds to a specific value, the NCR-Fwd performs forwarding on the corresponding time domain resources (in other words, in on state). Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station. Optionally, the above method (or the specific value) is applicable to the case where the NCR-Fwd does not support access link beam indication. Optionally, the above method (or the specific value) is applicable to FR1.

Optionally, the one or more time domain resources correspond to a subcarrier spacing (SCS)/numerology (or the same SCS/numerology). Optionally, the subcarrier spacing/numerology is (explicitly) indicated by the base station. Optionally (when the subcarrier spacing/numerology is not indicated), the subcarrier spacing/numerology refers to one of the following (taking subcarrier spacing as an example below):

#1. reference subcarrier spacing. For example, reference subcarrier spacing indication (referenceSubcarrierSpacing) in TDD configuration information (tdd-UL-DL-ConfigurationCommon). Optionally, the TDD configuration information is used for PCell of the NCR-MT.

#2. subcarrier spacing corresponding to the first indication (in other words, subcarrier spacing corresponding to receiving/monitoring/detecting the signal/channel corresponding to the indication).

#3. SCS for the signal or channel (e.g., PUCCH/PUSCH) carrying feedback corresponding to the first indication (e.g., HARQ-ACK information).

#4. subcarrier spacing of SSB. Optionally, the SSB is related to NCR-MT. For example, the subcarrier spacing of the SSB corresponding to the latest PRACH transmission by the NCR-MT; for another example, the base station indicates the TCI state of CORESET #0 through MAC-CE signaling, and the SSB corresponds to (is associated with) the TCI state.

#5. pre-defined subcarrier spacing. For example, 15 kHz, 30 kHz, 60 kHz, 120 kHz, 240 kHz.

#6. subcarrier spacing corresponding to CORESET #0 of the NCR-MT.

#7. subcarrier spacing corresponding to initial BWP of the NCR-MT. For example, subCarrierSpacingCommon in MIB.

#8. subcarrier spacing corresponding to active BWP of the NCR-MT. For example, the subcarrier spacing of active BWP corresponding to the PCell or the serving cell with the smallest ID of the NCR.

Optionally, the one or more time domain resources correspond to a set of time domain resources. Wherein, the time domain resource set corresponds to a subcarrier spacing (SCS)/numerology. Optionally, the indication/determination method of the subcarrier spacing/numerology is the same as the above method.

Optionally, each of the one or more time domain resources corresponds to a subcarrier spacing (SCS)/numerology (or the same SCS/numerology). Optionally, the indication/determination method of the subcarrier spacing/numerology is the same as the above method.

Optionally, at least one of the one or more time domain resources is determined according to the following information:

slot information. Optionally, the slot information includes at least one of the following:

one or more slot IDs. For example, the slot information is a list of slot IDs. The list is indicated through RRC. Optionally, the subcarrier spacing of the one or more slot IDs (or the list of slots) is determined according to subcarrier spacing of the corresponding time domain resources (or the subcarrier spacing is equal to the subcarrier spacing for the corresponding time domain resources). See above for specific methods.

subcarrier spacing (SCS) corresponding to the slot (ID/list). For different frequency ranges, the (possible) values corresponding to SCS are different. For example, when the frequency range is FR1, the SCS is 15 or 30 kHz. When the frequency range is FR2-1, the SCS is 60 or 120 kHz. When the frequency range is FR2-2, the SCS is 120 or 480 kHz. For another example, (Optionally, when the SCS corresponding to the slot is not provided) the subcarrier spacing corresponding to the slot (ID/list) can be understood as at least one of the following:

#1. reference subcarrier spacing. For example, reference subcarrier spacing indication (referenceSubcarrierSpacing) in TDD configuration information (tdd-UL-DL-ConfigurationCommon). Optionally, the TDD configuration information is used for PCell of the NCR-MT.

#2. subcarrier spacing of SSB. Optionally, the SSB is related to the NCR-MT. For example, the subcarrier spacing of the SSB corresponding to the latest PRACH transmission by the NCR-MT. For another example, the base station indicates the TCI state of CORESET #0 through MAC-CE signaling, and the SSB corresponds to (is associated with) the TCI state.

#3. pre-defined subcarrier spacing, for example, 15 kHz, 30 kHz, 60 kHz, 120 kHz, 240 kHz.

#4. subcarrier spacing corresponding to CORESET #0 of the NCR-MT.

#5. subcarrier spacing corresponding to initial BWP of the NCR-MT. For example, subCarrierSpacingCommon in MIB.

#6. subcarrier spacing corresponding to active BWP of the NCR-MT. For example, the subcarrier spacing of active BWP corresponding to the PCell or the serving cell with the smallest ID of the NCR.

symbol information.

For example, the symbol information here refers to the symbol information corresponding to the above (one/each of) slot information (or slot ID). For example, it indicates one/more/all symbols in the above one slot. For example, it indicates the first N symbols in the above one slot, where N can be 1, 2, 3, etc. For example, it indicates the last M symbols in the above one slot, where M can be 11, 12, 13, etc. The NCR-Fwd uses beams indicated by beam information on these indicated symbols. For example, the symbol information in a slot is indicated by a bit map. Specifically, the bitmap is a 14-bit bitmap, where the first bit indicates the first symbol of the slot, the second bit indicates the second symbol of the slot, and so on.

For another example, the symbol information refers to the SLIV (or, the start symbol and the symbol length). In other words, the symbols corresponding to the above (one/each) slot information (or slot ID).

Optionally, at least one of the one or more time domain resources are determined according to the following information:

slot information. Optionally, the slot information includes at least one of the following:

slot ID. For example, the slot ID corresponds to the start slot of the time domain resources (or the slot where the resources are located). Optionally, the subcarrier spacing of the slot is determined according to the subcarrier spacing of the corresponding time domain resources (or, the subcarrier spacing is equal to the subcarrier spacing of the corresponding time domain resources). See above for the method of determining the subcarrier spacing of time domain resources.

number of slots (N). When the slot ID (or the start slot) and the number of slots (N) are provided, it can be understood that the time domain resources refer to (all symbols of) N consecutive slots starting from the start slot. It can be understood that when N is not provided, N=1.

subcarrier spacing (SCS) corresponding to the slot (or slot ID). For different frequency ranges, the corresponding (possible) values of SCS are different. For example, when the frequency range is FR1, the SCS is 15 or 30 kHz. When the frequency range is FR2-1, the SCS is 60 or 120 kHz. When the frequency range is FR2-2, the SCS is 120 or 480 kHz. For another example, (Optionally, when the SCS corresponding to the slot is not provided) the subcarrier spacing corresponding to the slot (ID/list) can be understood as at least one of the following:

#1. reference subcarrier spacing. For example, reference subcarrier spacing indication (referenceSubcarrierSpacing) in TDD configuration information (tdd-UL-DL-ConfigurationCommon). Furthermore, the TDD configuration information is used for PCell of the NCR-MT.

#2. subcarrier spacing of SSB; further, the SSB is related to NCR-MT. For example, the subcarrier spacing of the SSB corresponding to the latest PRACH transmission by the NCR-MT. For another example, the base station indicates the TCI state of CORESET #0 via MAC-CE signaling, and the SSB corresponds to (is associated with) the TCI state.

#3. Pre-defined subcarrier spacings, for example, 15 kHz, 30 kHz, 60 kHz, 120 kHz, 240 kHz.

#4. subcarrier spacing corresponding to CORESET #0 of the NCR-MT.

#5. subcarrier spacing corresponding to initial BWP of the NCR-MT. For example, subCarrierSpacingCommon in MIB.

#6. subcarrier spacing corresponding to active BWP of the NCR-MT. For example, the subcarrier spacing of active BWP corresponding to the PCell or the serving cell with the smallest ID of the NCR.

symbol information. Optionally, the symbol information includes/corresponds to at least one of the following: a start symbol; symbol length. The start symbol and the symbol length (M) correspond to N consecutive symbols (i.e. time domain resources or symbols corresponding to time domain resources) starting from the start symbol in the start slot (i.e. time domain resources). Optionally, the start symbol and the symbol length are jointly encoded (e.g., determined by the SLIV).

number of repetitions

For example, when both the symbol length (M) and the number of repetitions (R) are provided, the time domain resources refer to M*R consecutive symbols starting from the start symbol in the start slot (or the slot determined by slot offset; or the slot where the time domain resources are located) (Optionally, when R is not provided, R=1).

For another example, when the number of repetitions (R) is provided, the SLIV (or the start symbols and the number of symbols) of R consecutive slots (starting from the start slot) are the same.

Optionally, the one or more time domain resources correspond to a periodicity information. Optionally, each of the one or more time domain resources corresponds to a periodicity, respectively. Optionally, the one or more time domain resources are repeated in the time domain according to the periodicity.

Optionally, the unit of the periodicity is second/millisecond/microsecond. Taking millisecond as an example, the specific values can be 0.5, 0.625, 1.25, 2, 2.5, 5, 10, 20, 40, 80, 160. Optionally, the unit of the periodicity is a symbol/slot/subframe/frame. Optionally, the SCS corresponding to the periodicity is indicated by the base station. Optionally, (when the SCS corresponding to the periodicity is not indicated by the base station), the SCS of the periodicity is equal to the subcarrier spacing of the corresponding time domain resources. See above for the method of determining the subcarrier spacing of time domain resources.

Optionally, the periodicity can be obtained through the indication of the base station. For example, the base station indicates the value of the periodicity (e.g., millisecond/slot and corresponding units described above). Optionally, the indication is dedicated indication (e.g., MAC-CE, RRC). Optionally, (when the periodicity indicated by the base station is not obtained), the periodicity can be obtained in the following ways:

#1. periodicity of SSB. For example, the NCR obtains SSB periodicity by receiving common signalling (ssb-PeriodicityServingCell).

#2. periodicity corresponding to PRACH occasions. For example, determined according to predefined rules (for example, equal to SSB periodicity in #1).

#3. periodicity of CSI-RS. For example, the periodicity for tracking reference signal (TRS).

#4. periodicity of the DL-UL pattern. For example, the periodicity provided by dl-UL-TransmissionPeriodicity in TDD-UL-DL-ConfigCommon.

Embodiment 1B

The NCR receives second indication from the base station, which corresponds to one or more time domain resources.

Optionally, the signaling corresponding to the second indication is DCI. For example, the indication corresponds to DCI which is dedicated to NCR or the NCR-Fwd.

Optionally, the one or more time domain resources are in one-to-one correspondence with the on-off information. For example, each of the time domain resources mentioned above corresponds to an on-off indicator. Optionally, the indication is used to indicate whether the NCR-Fwd is turned on or off on the corresponding time domain resources (in other words, whether it is in on or off state). Optionally, if (one of) the one or more time domain resources has no corresponding beam ID or on-off indication, the NCR determines that the NCR is in the on/off state on the corresponding time domain resources.

Optionally, the NCR-Fwd does not perform forwarding on the one or more time domain resources. It can be understood that when the NCR-Fwd is in the off state, the NCR-Fwd does not perform forwarding the one or more time domain resources.

Optionally, the one or more time domain resources correspond to a beam ID.

Optionally, the one or more time domain resources are in one-to-one correspondence with one or more beam IDs.

Optionally, the NCR-Fwd applies corresponding beam indication (or beam ID) on the one or more time domain resources. Or, the NCR-Fwd uses the corresponding beam ID (related spatial filter) for uplink reception and/or downlink perform forwarding on the corresponding time domain resources according to the second indication.

Optionally, when the beam ID corresponds to a specific value, the NCR-Fwd does not perform forwarding on the corresponding time domain resources (in other words, it is in off state). Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station. Optionally, the above method (or the specific value) is applicable to the case where the NCR-Fwd does not support access link beam indication. Optionally, the above method (or the specific value) is applicable to FR1.

Optionally, when the beam ID corresponds to a specific value, the NCR-Fwd performs forwarding on the corresponding time domain resources (in other words, it is in the on state). Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station. Optionally, the above method (or the specific value) is applicable to the case where the NCR-Fwd does not support access link beam indication. Optionally, the above method (or the specific value) is applicable to FR1.

Optionally, the one or more time domain resources correspond to a subcarrier spacing (SCS)/numerology (or the same SCS/numerology). Optionally, the subcarrier spacing/numerology is (explicitly) indicated by the base station. Optionally (when the subcarrier spacing/numerology is not indicated), the subcarrier spacing/numerology refers to one of the following (taking subcarrier spacing as an example below):

#1. reference subcarrier spacing. For example, reference subcarrier spacing indication (referenceSubcarrierSpacing) in TDD configuration information (tdd-UL-DL-ConfigurationCommon). Optionally, the TDD configuration information is used for PCell of the NCR-MT.

#2. subcarrier spacing corresponding to the second indication (or subcarrier spacing corresponding to receiving/monitoring/detecting the signal/channel corresponding to the indication).

#3. SCS of the signal or channel (e.g., PUCCH/PUSCH) carrying feedback corresponding to the second indication (e.g., HARQ-ACK information).

#4. subcarrier spacing of SSB. Optionally, the SSB is related to the NCR-MT. For example, the subcarrier spacing of the SSB corresponding to the latest PRACH transmission by the NCR-MT. For another example, the base station indicates the TCI state of CORESET #0 through MAC-CE signaling, and the SSB corresponds to (is associated with) the TCI state.

#5. pre-defined subcarrier spacing. For example, 15 kHz, 30 kHz, 60 kHz, 120 kHz, 240 kHz.

#6. subcarrier spacing corresponding to CORESET #0 of the NCR-MT.

#7. subcarrier spacing corresponding to initial BWP of the NCR-MT. For example, subCarrierSpacingCommon in MIB.

#8. subcarrier spacing corresponding to active BWP of the NCR-MT. For example, the subcarrier spacing of active BWP corresponding to the PCell or the serving cell with the smallest ID of the NCR.

Optionally, the one or more time domain resources correspond to a set of time domain resources. Wherein, the set of time domain resources corresponds to a subcarrier spacing (SCS)/numerology (numerology). Optionally, the indication/determination method of the subcarrier spacing/numerology is the same as the above method.

Optionally, each of the one or more time domain resources corresponds to a subcarrier spacing (SCS)/numerology (or the same SCS/numerology). Optionally, the indication/determination method of the subcarrier spacing/numerology is the same as the above method.

Optionally, at least one of the one or more time domain resources is determined according to the following information:

slot offset (K). It can be understood that the time domain offset is used to determine the slot where the time domain resources are located or the start slot of the time domain resources. Optionally, the slot where the time domain resources are located and/or the start slot of the time domain resources are slot n+K, or slot $$\left\lfloor n \cdot \frac{2^{u\_T}}{2^{u\_D}} \right\rfloor + K.$$

Optionally, u_T is the SCS (configuration) of the time domain resources. Slot n can be understood as one of the following:

#1. slot where DCI corresponding to the second indication is located (or the slot where the end of the PDCCH corresponding to the DCI is located). Optionally, u_D is the SCS (configuration) of the PDCCH.

#2. slot where the PUSCH or PUCCH carrying the HARQ-ACK information for the DCI corresponding to the second indication is located (or the slot where the end of the PUSCH or PUCCH carrying the HARQ-ACK information for the DCI corresponding to the second indication is located). Optionally, u_D is the SCS (configuration) of the PUSCH or PUCCH.

#3. the first slot which is X time units (e.g., symbols/slots) after the slot of the DCI (PDCCH, or the last symbol/slot of the PDCCH) corresponding to the second indication. Optionally, X is a fixed value. Optionally, X is related to the capability reported by the NCR. Optionally, X is configured by the base station (via RRC signaling). Optionally, X refers to the beam application time. Optionally, X refers to the on-off (state) application time. Optionally, the subcarrier spacing of the X time units is determined based on the subcarrier spacing corresponding to the time domain resources. Optionally, the subcarrier spacing of the X time units is the smallest/largest subcarrier spacing among the subcarrier spacings corresponding to one or more time domain resources corresponding to the second indication. The subcarrier spacing of the first slot is determined based on the subcarrier spacing corresponding to the time domain resources.

#4. the first slot which is X time units (e.g., symbols/slots) after the slot of (the last symbols/slots of) PUSCH or PUSCH carrying HARQ-ACK information for the DCI corresponding to the second indication. Optionally, X is a fixed value. Optionally, X is related to the capability reported by the NCR. Optionally, X is configured by the base station (via RRC signaling). Optionally, X refers to the beam application time. Optionally, X refers to the on-off (state) application time. Optionally, the subcarrier spacing of the X time units is determined based on the subcarrier spacing corresponding to the time domain resources. Optionally, the subcarrier spacing of the X time units is the smallest/largest subcarrier spacing among the subcarrier spacings corresponding to one or more time domain resources corresponding to the second indication. The subcarrier spacing of the first slot is determined based on the subcarrier spacing corresponding to the time domain resources.

Optionally, the slot offset is determined according to/based on the SCS/numerology of the time domain resources.

Optionally, the slot offset is determined with reference to the slots/symbols of the time domain resources.

Optionally, the slot n and/or slot n+k are determined according to/based on the SCS/numerology of the time domain resources (i.e., the time domain resources for applying beam indication).

Optionally, the slot n and/or slot n+k are determined with reference to the slots/symbols of the time domain resources.

Indication/Determination Method of Slot Offset

#1. Base Station Indication

For example, the slot offset is indicated by the base station. The indication signaling is at least one of RRC, MAC-CE or DCI.

#2. Pre-Defined. Optionally, at Least One of the Following:

For example, the slot offset (by default) is 0. For example, when the time domain offset is not indicated by the base station, the time domain offset is 0.

For another example, the value of time-domain offset is related to SCS or frequency range (for example, the NCR determines the value of time-domain offset according to SCS or frequency range). For example, the default value of the slot offset is related to SCS (for example, when SCS=120 kHz, the value of the slot offset is 2. For another example, when SCS=15 kHz, the value of slot offset is 1).

For another example, the value of the slot offset is related to whether the corresponding time domain resources are used for downlink forwarding or uplink reception (for example, the NCR determines the value of the slot offset according to whether the corresponding time domain resources are used for downlink forwarding or uplink reception). For example, when the corresponding slot resources are time domain resources for downlink forwarding, the default value of the slot offset is 2. When the corresponding time domain resources are the time domain resources for uplink reception, the default value of slot offset is 3.

Number of Slots (N)

It can be understood that the NCR determines the start slot according to the slot offset. Optionally, the NCR determines that the time domain resources are (all symbols of) N consecutive slots (starting from the start slot) according to the start slot and the number of slots N. When N is not provided, N=1.

Optionally, at least one of the one or more-time domain resources is determined according to the following information:

slot offset (k). It can be understood that the slot offset is used to determine the slot where the time domain resources are located or the start slot of the time domain resources. Optionally, the slot where the time domain resources are located and/or the start slot of the time domain resources are slot n+K, or slot $$\left\lfloor n \cdot \frac{2^{u\_T}}{2^{u\_D}} \right\rfloor + K.$$

Optionally, u_T is the SCS (configuration) of the time domain resources. Slot n can be understood as one of the following:

#1. slot where DCI corresponding to the second indication is located (or the slot where the end of the PDCCH corresponding to the DCI is located). Optionally, u_D is the SCS (configuration) of the PDCCH.

#2. slot where the PUSCH or PUCCH carrying the HARQ-ACK information for the DCI corresponding to the second indication is located (or the slot where the end of the PUSCH or PUCCH carrying the HARQ-ACK information for the DCI corresponding to the second indication is located). Optionally, u_D is the SCS (configuration) of the PUSCH or PUCCH.

#3. the first slot which is X time units (e.g., symbols/slots) after the time unit of the DCI (PDCCH, or the last symbol/slot of the PDCCH) corresponding to the second indication. Optionally, X is a fixed value. Optionally, X is related to the capability reported by the NCR. Optionally, X is configured by the base station (through RRC signaling). Optionally, X refers to the beam application time. Optionally, X refers to the on-off (state) application time. Optionally, the subcarrier spacing of the X time units is determined based on the subcarrier spacing corresponding to the time domain resources. Optionally, the subcarrier spacing of the X time units is the smallest/largest subcarrier spacing among the subcarrier spacings corresponding to one or more time domain resources corresponding to the second indication. The subcarrier spacing of the first slot is determined based on the subcarrier spacing corresponding to the time domain resources.

#4. the first slot which is X time units (e.g., symbols/slots) after the time unit of (the last symbols/slots of) PUSCH or PUSCH carrying HARQ-ACK information for the DCI corresponding to the second indication. Optionally, X is a fixed value. Optionally, X is related to the capability reported by the NCR. Optionally, X is configured by the base station (through RRC signaling). Optionally, X refers to the beam application time. Optionally, X refers to the on-off (state) application time. Optionally, the subcarrier spacing of the X time units is determined based on the subcarrier spacing corresponding to the time domain resources. Optionally, the subcarrier spacing of the X time units is the smallest/largest subcarrier spacing among the subcarrier spacings corresponding to one or more time domain resources corresponding to the second indication. The subcarrier spacing of the first slot is determined based on the subcarrier spacing corresponding to the time domain resources.

Optionally, the slot offset is determined according to/based on the SCS/numerology of the time domain resources (i.e., the time domain resources for applying beam indication).

Optionally, the slot offset is determined with reference to the slots/symbols of the time domain resources.

Optionally, the slot n and/or slot n+k are determined according to/based on the SCS/numerology of the time domain resources.

Optionally, the slot n and/or slot n+k are determined with reference to the slots/symbols of the time domain resources.

Indication/Determination Method of Slot Offset

#1. Base Station Indication

For example, the slot offset is indicated by the base station. The indication signaling is at least one of RRC, MAC-CE or DCI.

#2. Pre-Defined. Specifically, at Least One of the Following:

For example, the slot offset (by default) is 0. For example, when the time domain offset is not indicated by the base station, the time domain offset is 0.

For another example, the value of time-domain offset is related to SCS or frequency range (for example, the NCR determines the value of time-domain offset according to SCS or frequency range). For example, the default value of the slot offset is related to SCS (for example, when SCS=120 kHz, the value of the slot offset is 2. For another example, when SCS=15 kHz, the value of slot offset is 1).

For another example, the value of the slot offset is related to whether the corresponding time domain resources are used for downlink forwarding or uplink reception (for example, the NCR determines the value of the slot offset according to whether the corresponding time domain resources are used for downlink forwarding or uplink reception). For example, when the corresponding slot resources are time domain resources for downlink forwarding, the default value of the slot offset is 2. When the corresponding time domain resources are the time domain resources for uplink reception, the default value of slot offset is 3.

symbol information. Optionally, the symbol information includes/corresponds to at least one of the following: start symbol; symbol length. The start symbol and the symbol length (M) correspond to N consecutive symbols (i.e. time domain resources or symbols corresponding to time domain resources) starting from the start symbol in the slot or the start slot determined by the slot offset. Optionally, the start symbol and the symbol length are determined by the SLIV.

Number of Repetitions

For example, when both the symbol length (M) and the number of repetitions (R) are provided, the time domain resources refer to M*R consecutive symbols starting from the start symbol in the start slot (or the slot determined by slot offset; or the slot where the time domain resources are located) (optionally, when R is not provided, R=1).

For another example, when the number of repetitions (R) is provided, the SLIV (or the start symbols and the number of symbols) of R consecutive slots (starting from the start slot) are the same.

Optionally, when the offset (e.g., time domain offset) between the second indication (DCI) (the last symbol of the corresponding PDCCH) and (the first symbol of) the first time domain resource of the one or more time domain resources is greater than or equal to a first threshold (e.g., the threshold related to the beam application time), the NCR applies the corresponding beam indication/beam information/beam ID on the first time domain resources. Optionally, when the first time domain resource (or the first symbol of the first time domain resource) is used for uplink forwarding by the corresponding NCR-Fwd, the influence of TA on the offset should be considered (or the offset is related to TA).

Optionally, when the offset (e.g., time domain offset) between the second indication (DCI) (the last symbol of the corresponding PDCCH) and (the first symbol of) the first time domain resource of the one or more time domain resources is greater than or equal to a second threshold (e.g., the threshold for the on-off, for another example, the threshold related to on-off of the NCR-Fwd), the NCR applies the corresponding beam indication/beam information/beam ID on the first time domain resource. Optionally, when the first time domain resource (or the first symbol of the first time domain resource) is used for uplink forwarding by the corresponding NCR-Fwd, the influence of TA on the offset should be considered (or the offset is related to TA).

Optionally, the NCR expects the offset (e.g., time domain offset) between the second indication (DCI) (the last symbol of the corresponding PDCCH) and (the first symbol of) the first time domain resource of the one or more time domain resources to be greater than or equal to a first threshold (e.g., a threshold related to beam application time). Optionally, the SCS of the first threshold is determined based on the SCS of the first time domain resource. Optionally, the SCS of the first threshold is equal to the SCS of the first time domain resource. Optionally, the first time domain resource refers to the earliest time domain resource among the one or more time domain resources. Optionally, the first time domain resource refers to the time domain resource with the earliest start (or start slot/symbol) among the one or more time domain resources. Optionally, the first time domain resource refers to the time domain resource with the smallest slot offset among the one or more time domain resources (if there are multiple time domain resources with the smallest slot offset, it is the time domain resource with the smallest start symbol among the multiple time domain resources). Optionally, the first time domain resource is the time domain resource with the smallest/largest SCS among the one or more time domain resources (in other words, the SCS of the first threshold is determined based on the SCS resource of the time domain resource with the smallest/largest SCS among the one or more time domain resources). Optionally, the first threshold is determined based on whether the first resource is used for uplink forwarding or downlink forwarding (for example, when the first time domain resource is determined as a time domain resource for downlink forwarding according to TDD configuration information, the first threshold is a first predefined value. When the first time domain resource is determined as a time domain resource for uplink forwarding according to TDD configuration information, the first threshold is a second predefined value. Optionally, the second predefined value is less than the first predefined value). Optionally, when the first time domain resource (or the first symbol of the first time domain resource) is used for uplink forwarding by the corresponding NCR-Fwd, the influence of TA on the offset should be considered (or the offset is related to TA).

Optionally, the NCR expects the offset (e.g., time domain offset) between the second indication (DCI) (the last symbol of the corresponding PDCCH) and (the first symbol of) the first time domain resource of the one or more time domain resources to be greater than or equal to a second threshold (e.g., the threshold for on-off, E.g., a threshold associated with on-off of the NCR-Fwd). Optionally, the SCS of the second threshold is determined based on the SCS of the first time domain resource. Optionally, the SCS of the second threshold is equal to the SCS of the first time domain resource. Optionally, the first time domain resource refers to the earliest time domain resource among the one or more time domain resources. Optionally, the first time domain resource refers to the time domain resource with the earliest start (or start slot/symbol) among the one or more time domain resources. Optionally, the first time domain resource refers to the time domain resource with the smallest slot offset among the one or more time domain resources (if there are multiple time domain resources with the smallest slot offset, it is the time domain resource with the smallest start symbol among the multiple time domain resources). Optionally, the first time domain resource is the time domain resource with the smallest/largest SCS among the one or more time domain resources (in other words, the SCS of the first threshold is determined based on the SCS resource of the time domain resource with the smallest/largest SCS among the one or more time domain resources). Optionally, the second threshold is determined based on whether the first resource is used for uplink forwarding or downlink forwarding (for example, when the first time domain resource is determined as a time domain resource for downlink forwarding according to TDD configuration information, the second threshold is a first predefined value. When the first time domain resource is determined as a time domain resource for uplink forwarding according to TDD configuration information, the second threshold is a second predefined value. Optionally, the second predefined value is less than the first predefined value). Optionally, when the first time domain resource (or the first symbol of the first time domain resource) is used for uplink forwarding by the corresponding NCR-Fwd, the influence of TA on the offset should be considered (or the offset is related to TA).

Embodiments 1A-1B have the advantage that the NCR determines the time domain resources according to the indication of the base station, so as to turn on or off the NCR-Fwd on the corresponding time domain resources (or, apply the corresponding beam indication to the NCR-Fwd on the corresponding time domain resources). Therefore, the base station can correctly control the behaviors of the NCR on time domain resources and improve the reliability of the system.

Embodiment 1C

NCR receives indication; the indication corresponds to a beam ID. The beam ID may refer to the above-mentioned specific beam ID (beam ID used to indicate the on or off of the NCR-Fwd) or the beam ID (for a beam/spatial filter) used to indicate NCR-Fwd to perform reception and/or forwarding.

Optionally, the indication from a DCI.

Optionally, the beam ID corresponds to a time domain resource.

Optionally, the NCR-Fwd applies the beam indication on the time domain resource. In other words, the NCR-Fwd uses the beam ID (related spatial filter) for uplink reception and/or downlink forwarding on corresponding time domain resource according to the indication.

Optionally, the NCR-Fwd does not perform forwarding on the time domain resource.

Optionally, the NCR determines the time for applying the indication (or the time used to apply the indication) according to the beam ID. For example, when the beam ID is not equal to a specific value, the time for applying the indication is the first time (e.g., beam application time). For another example, when the beam ID is equal to the specific value, the time for applying the indication is a second time (for example, the time for applying the on-off. Another example is the on-off time. Another example is the on time. Another example is the off time).

Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station.

Optionally, the NCR applies the corresponding indication (for example, applies the corresponding beam indication) the first time after receiving the indication (or sending the feedback corresponding to the indication).

Optionally, the NCR applies the corresponding indication (for example, applies the corresponding on-off indication) on the second time after receiving the indication (or sending the feedback corresponding to the indication).

Embodiment 1D

The NCR receives indication; the indication corresponds to one or more beam IDs. The one or more beam IDs may refer to the above-mentioned specific beam ID (beam ID for indicating the on or off of the NCR-Fwd) or beam ID (for a beam/spatial filter) for indicating NCR-Fwd to perform reception and/or forwarding.

Optionally, the indication corresponds to DCI.

Optionally, each of the one or more beam IDs corresponds to a time domain resource.

Optionally, the NCR-Fwd applies the corresponding beam ID (beam ID for beam indication of the NCR-Fwd) on the corresponding time domain resources. In other words, the NCR-Fwd uses the one or more beam IDs (related spatial filters) for uplink reception and/or downlink forwarding on the corresponding time domain resource according to the indication.

Optionally, the NCR-Fwd does not perform forwarding on the corresponding time domain resource.

Optionally, the NCR determines the time for applying the indication (or the time used to apply the indication) according to the one or more beam IDs. For example, when at least one of the one or more beam IDs is equal to a specific value and the other is not, the time for applying the indication is one of the following:

- a first time (e.g., beam application time);
- a second time (e.g., the time when the on-off is applied. Another example is the on-off time. Another example is the on time. Another example is the off time);
- the longer of the first time and the second time;
- the shorter of the first time and the second time.

For another example, when one or more beam IDs are not equal to a specific value, the time for applying the indication is the first time (e.g., beam application time). For another example, when the beam ID is equal to a specific value, the time for applying the indication is a second time (for example, the time for applying the on-off). Another example is the on-off time. Another example is the on time. Another example is the off time).

Optionally, the specific value may be one or more values. Optionally, the specific value is at least one of −1, −2, 0, 1 and 2, for example. Optionally, the specific value is the lowest beam ID (configured by the base station). Optionally, the specific value is configured by the base station.

Optionally, the NCR applies the corresponding indication (for example, applies the corresponding beam indication) the first time after receiving the indication (or sending the feedback corresponding to the indication).

Optionally, the NCR applies the corresponding indication (for example, applies the corresponding on-off indication) the second time after receiving the indication (or sending the feedback corresponding to the indication).

Embodiment 1E

NCR receives indication; the indication corresponds to one or more beam IDs. The one or more beam IDs may refer to the above-mentioned specific beam ID (beam ID for indicating the on or off of the NCR-Fwd) or beam ID (for a beam/spatial filter) for indicating NCR-Fwd to perform reception and/or forwarding.

Optionally, the indication corresponds to DCI.

Optionally, each of the one or more beam IDs corresponds to a time domain resource.

Optionally, the NCR-Fwd applies the corresponding beam ID (beam ID for beam indication of the NCR-Fwd) on the corresponding time domain resource.

Optionally, the NCR-Fwd does not perform forwarding on the corresponding time domain resource.

Optionally, the NCR expects that all of the one or more beam IDs correspond to a specific value; Optionally, the NCR expects that none of the one or more beam IDs corresponds to a specific value.

Optionally, the NCR determines the time for applying the indication (or the time used to apply the indication) according to the one or more beam IDs. For example, when the one or more beam IDs are not equal to a specific value, the time for applying the indication is the first time (e.g., beam application time). For another example, when the beam ID is equal to a specific value, the time for applying the indication is a second time (for example, the time for applying the on-off. Another example is the on-off time. Another example is the on time. Another example is the off time).

Optionally, the specific value may be one or more values. Optionally, the specific value is, for example, at least one of −1, −2, 0, 1 and 2. Optionally, the specific value is the lowest beam ID (configured by the base station). Optionally, the specific value is configured by the base station.

Optionally, the NCR applies the corresponding indication (for example, applies the corresponding beam indication) the first time after receiving the indication signaling (or sending the feedback corresponding to the indication).

Optionally, the NCR applies the corresponding indication (for example, applies the corresponding on-off indication) the second time after receiving the indication signaling (or sending the feedback corresponding to the indication).

For the above Embodiments 1C-1E, it can be understood that the specific beam ID is not used to indicate the beam of the NCR-Fwd, but is used to indicate the on or off (in the on state or in the off state) of the NCR-Fwd. In addition, the beam IDs other than the specific beam ID are used for beam indication of the NCR-Fwd. This is because the time for applying beam indication is different from the time for applying the on-off indication, further solution is needed to distinguish the application time. Therefore, the following solution is proposed to enable the NCR to determine the application time for the corresponding indication signaling. Therefore, the ambiguity of the indicated application time is avoided, and the performance of the system is improved.

The NCR behaviors are described below. For example, NCR behaviors related to control link and/or backhaul link.

Example 1F-1

(Optionally, if NCR supports simultaneous uplink transmission of backhaul link and control link, or if NCR does not support simultaneous uplink transmission of backhaul link and control link, or if NCR only supports time-division multiplexed uplink transmission of backhaul link and control link), NCR does not (simultaneously) transmit on control link (or transmit uplink signal/channel) and transmit on backhaul link at the same and/or adjacent time unit(s). For example, time unit(s) can be time slot(s) or symbol(s).

Optionally, the uplink signal/channel may be at least one of PRACH, PUSCH, PUCCH and SRS. Take PRACH as an example of the uplink signal/channel.

Optionally, the subcarrier spacing or subcarrier spacing configuration of the time unit may be at least one of the following:

- Subcarrier spacing, or subcarrier spacing configuration of the uplink signal/channel. For example, the subcarrier spacing, or the subcarrier spacing configuration of the uplink bandwidth part (BWP) of (with) the PRACH;
- subcarrier spacing, or, subcarrier spacing configuration of (related to) the control link. For example, subcarrier spacing, or subcarrier spacing configuration associated with/corresponding to the transmission of the control link;
- subcarrier spacing, or subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resources associated with or corresponding to the transmission of the control link;
- subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;
- minimum/maximum subcarrier spacing (configuration) among subcarrier spacing (configuration) of (related to) uplink signal/channel and subcarrier spacing (configuration) of (related to) backhaul link;
- minimum/maximum subcarrier spacing (configuration) among subcarrier spacing (configuration) of (related to) control link and subcarrier spacing (configuration) of (related to) backhaul link;
- minimum/maximum subcarrier spacing (configuration) among subcarrier spacing (configuration) of (related to) an uplink signal/channel and subcarrier spacing (configuration) of (related to) NCR-Fwd;
- minimum/maximum subcarrier spacing (configuration) among subcarrier spacing (configuration) of (related to) control link and subcarrier spacing (configuration) of (related to) NCR-Fwd.

Optionally, the time unit may be time unit that refers to at least one of the following:

time unit of PRACH (or PRACH transmission);

time unit of control link. For example, the time unit related/corresponding to control link;

time unit of backhaul link. For example, the time unit related/corresponding to the (transmission of) backhaul link. For example, the time unit (of time resources) related to/associated with the access link corresponding to/associated with (transmission of) backhaul link;

time unit of NCR-Fwd. For example, the time unit (of time resources) related to or associated with the access link corresponding to or associated with (transmission of) backhaul link of NCR-Fwd.

This method avoids the problems caused by the transmission of control link and backhaul link by the NCR in the same time domain resources or time domain resources that close to each other in time, and improves the reliability of communication system.

Example 1F-2

(Optionally, if NCR supports simultaneous uplink transmission of backhaul link and control link, or if NCR does not support simultaneous uplink transmission of backhaul link and control link, or if NCR only supports time division multiplexed uplink transmission of backhaul link and control link), NCR does not transmit on backhaul link at a time unit overlapping with an uplink signal/channel (or transmission of an uplink signal/channel, or transmission of an uplink signal/channel on control link). For example, the time unit can be a time slot or symbol.

Optionally, the uplink signal/channel may be at least one of PRACH, PUSCH, PUCCH and SRS. Take PRACH as an example of the uplink signal/channel.

Optionally, the subcarrier spacing or subcarrier spacing configuration of the time unit may be at least one of the following:

subcarrier spacing, or subcarrier spacing configuration of an uplink signal/channel. For example, the subcarrier spacing, or the subcarrier spacing configuration of the uplink bandwidth part (BWP) of (with) the PRACH;

subcarrier spacing, or, subcarrier spacing configuration of (related to) the control link. For example, the subcarrier spacing, or the subcarrier spacing configuration associated with/corresponding to the transmission of the control link;

subcarrier spacing, or the subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resource associated with or corresponding to the transmission of the control link;

subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;

minimum/maximum subcarrier spacing (configuration) among subcarrier spacing (configuration) of (related to) an uplink signal/channel and subcarrier spacing (configuration) of (related to) backhaul link;

minimum/maximum subcarrier spacing (configuration) among subcarrier spacing (configuration) of (related to) control link and subcarrier spacing (configuration) of (related to) backhaul link;

minimum/maximum subcarrier spacing (configuration) among subcarrier spacing (configuration) of (related to) an uplink signal/channel and subcarrier spacing (configuration) of (related to) NCR-Fwd;

minimum/maximum subcarrier spacing (configuration) among subcarrier spacing (configuration) of (related to) control link and subcarrier spacing (configuration) of (related to) NCR-Fwd.

Optionally, the time unit may be a time unit that refers to at least one of the following:

time unit of PRACH (or PRACH transmission);

time unit of control link. For example, the time unit related/corresponding to control link;

time unit of backhaul link. For example, the time unit related/corresponding to the (transmission of) backhaul link. For example, the time unit (of time resources) related to/associated with the access link corresponding to/associated with (transmission of) backhaul link;

time unit of NCR-Fwd. For example, the time unit (of time resources) related to/associated with the access link corresponding to/associated with (transmission of) backhaul link of NCR-Fwd.

This method avoids the problems caused by the transmission of control link and backhaul link by NCR in the same time domain resources or time domain resources that close to each other in time, and improves the reliability of communication system. For example, NCR gives priority to transmitting control link (relative to backhaul link), which improves the reliability of control link of NCR.

Example 1F-3

(Optionally, if NCR supports simultaneous uplink transmission of backhaul link and control link, or if NCR does not support simultaneous uplink transmission of backhaul link and control link, or if NCR only supports time-division multiplexed uplink transmission of backhaul link and control link), NCR does not transmit (or transmit uplink signals/channels) on the control link in a time unit overlapping (or overlapping in time domain) with the transmission on backhaul link. For example, the time unit can be a time slot or symbol.

Optionally, the uplink signal/channel may be at least one of PRACH, PUSCH, PUCCH and SRS. Take PRACH as an example of the uplink signal/channel.

Optionally, the subcarrier spacing or subcarrier spacing configuration of the time unit may be at least one of the following:

subcarrier spacing, or subcarrier spacing configuration of an uplink signal/channel. For example, the subcarrier spacing, or the subcarrier spacing configuration of the uplink bandwidth part (BWP) of (with) the PRACH;

subcarrier spacing, or, subcarrier spacing configuration of (related to) the control link. For example, the subcarrier spacing, or the subcarrier spacing configuration associated with/corresponding to the transmission of the control link;

subcarrier spacing, or the subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resource associated with or corresponding to the transmission of the control link;

subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;

minimum/maximum subcarrier spacing (configuration) among subcarrier spacing (configuration) of (related to) an uplink signal/channel and subcarrier spacing (configuration) of (related to) backhaul link;

minimum/maximum subcarrier spacing (configuration) among subcarrier spacing (configuration) of (related to) control link and subcarrier spacing (configuration) of (related to) backhaul link;

minimum/maximum subcarrier spacing (configuration) among subcarrier spacing (configuration) of (related to) an uplink signal/channel and subcarrier spacing (configuration) of (related to) NCR-Fwd;

minimum/maximum subcarrier spacing (configuration) among subcarrier spacing (configuration) of (related to) control link and subcarrier spacing (configuration) of (related to) NCR-Fwd.

Optionally, the time unit may be a time unit that refers to at least one of the following:

time unit of PRACH (or PRACH transmission);

time unit of control link. For example, the time unit related/corresponding to control link;

time unit of backhaul link. For example, the time unit related/corresponding to the (transmission of) backhaul link. For example, the time unit (of time resources) related to/associated with the access link corresponding to/associated with (transmission of) backhaul link;

time unit of NCR-Fwd. For example, the time unit (of time resources) related to/associated with the access link corresponding to/associated with (transmission of) backhaul link of NCR-Fwd.

This method avoids the problems caused by the transmission of control link and backhaul link by NCR in the same time domain resources or time domain resources that close to each other in time, and improves the reliability of communication system. For example, NCR gives priority to transmitting the backhaul link (relative to the control link), which improves the reliability of the backhaul link of NCR.

Example 1G-1

When at least one of the following conditions is met, NCR does not (simultaneously) transmit on the control link (or transmit the uplink signal/channel) and transmit on the backhaul link:

NCR supports simultaneous uplink transmission of backhaul link and control link, or NCR does not support simultaneous uplink transmission of backhaul link and control link, or NCR only supports time division multiplexing uplink transmission of backhaul link and control link;

When the gap between the uplink signal/channel of the transmission of the control link and the backhaul link is less than a predefined value (for example, 2 symbols or 4 symbols). For example, when the gap between the first time unit of the uplink signal/channel (or uplink signal/channel transmission) of the control link (in the first time slot) and the last time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (y). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4;

When the gap between the uplink signal/channel of the transmission of the control link and the backhaul link is less than a predefined value (for example, 2 symbols or 4 symbols). For example, when the gap between the last time unit of the uplink signal/channel (or uplink signal/channel transmission) of the control link (in the first time slot) and the first time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (y). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4.

Optionally, the subcarrier spacing/subcarrier spacing configuration (y) may be at least one of the following:

subcarrier spacing, or subcarrier spacing configuration of an uplink signal/channel. For example, the subcarrier spacing, or the subcarrier spacing configuration of the uplink bandwidth part (BWP) of (with) the PRACH;

subcarrier spacing, or, subcarrier spacing configuration of (related to) the control link. For example, the subcarrier spacing, or the subcarrier spacing configuration associated with/corresponding to the transmission of the control link;

subcarrier spacing, or the subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resource associated with or corresponding to the transmission of the control link;

subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;

minimum/maximum subcarrier spacing (configuration) among subcarrier spacing (configuration) of (related to) an uplink signal/channel and subcarrier spacing (configuration) of (related to) backhaul link;

minimum/maximum subcarrier spacing (configuration) among subcarrier spacing (configuration) of (related to) control link and subcarrier spacing (configuration) of (related to) backhaul link;

minimum/maximum subcarrier spacing (configuration) among subcarrier spacing (configuration) of (related to) an uplink signal/channel and subcarrier spacing (configuration) of (related to) NCR-Fwd;

minimum/maximum subcarrier spacing (configuration) among subcarrier spacing (configuration) of (related to) control link and subcarrier spacing (configuration) of (related to) NCR-Fwd.

Optionally, the uplink signal/channel may be at least one of PRACH, PUSCH, PUCCH and SRS. Take the uplink signal/channel being PRACH as an example.

Optionally, the time unit may be a time unit that refers to at least one of the following:

time unit of PRACH (or PRACH transmission);

time unit of control link. For example, the time unit related/corresponding to control link;

time unit of backhaul link. For example, the time unit related/corresponding to the (transmission of) backhaul link. For example, the time unit (of time resources) related to/associated with the access link corresponding to/associated with (transmission of) backhaul link;

time unit of NCR-Fwd. For example, the time unit (of time resources) related to/associated with the access link corresponding to/associated with (transmission of) backhaul link of NCR-Fwd.

This method avoids the problems caused by the transmission of NCR control link and backhaul link in the same time domain resources or time domain resources that close to each other in time, and improves the reliability of communication system.

Example 1G-2

When at least one of the following conditions is met, NCR does not transmit on the backhaul link:

NCR supports simultaneous uplink transmission of backhaul link and control link, or NCR does not support simultaneous uplink transmission of backhaul link and control link, or NCR only supports time division multiplexing uplink transmission of backhaul link and control link;

When the gap between the uplink signal/channel of the transmission of the control link and the backhaul link is less than a predefined value (for example, 2 symbols or 4 symbols). For example, when the gap between the first time unit of the uplink signal/channel (or uplink signal/channel transmission) of the control link (in the first time slot) and the last time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (μ). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4;

When the gap between the uplink signal/channel of the transmission of the control link and the backhaul link is less than a predefined value (for example, 2 symbols or 4 symbols). For example, when the gap between the last time unit of the uplink signal/channel (or uplink signal/channel transmission) of the control link (in the first time slot) and the first time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (μ). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4.

Optionally, the subcarrier spacing/subcarrier spacing configuration (y) may be at least one of the following:

subcarrier spacing, or subcarrier spacing configuration of an uplink signal/channel. For example, the subcarrier spacing, or the subcarrier spacing configuration of the uplink bandwidth part (BWP) of (with) the PRACH;

subcarrier spacing, or, subcarrier spacing configuration of (related to) the control link. For example, the subcarrier spacing, or the subcarrier spacing configuration associated with/corresponding to the transmission of the control link;

subcarrier spacing, or the subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resource associated with or corresponding to the transmission of the control link;

subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;

minimum/maximum subcarrier spacing (configuration) among subcarrier spacing (configuration) of (related to) an uplink signal/channel and subcarrier spacing (configuration) of (related to) backhaul link;

minimum/maximum subcarrier spacing (configuration) among subcarrier spacing (configuration) of (related to) control link and subcarrier spacing (configuration) of (related to) backhaul link;

minimum/maximum subcarrier spacing (configuration) among subcarrier spacing (configuration) of (related to) an uplink signal/channel and subcarrier spacing (configuration) of (related to) NCR-Fwd;

minimum/maximum subcarrier spacing (configuration) among subcarrier spacing (configuration) of (related to) control link and subcarrier spacing (configuration) of (related to) NCR-Fwd.

Optionally, the uplink signal/channel may be at least one of PRACH, PUSCH, PUCCH and SRS. Take the uplink signal/channel being PRACH as an example.

Optionally, the time unit may be a time unit that refers to at least one of the following:

time unit of PRACH (or PRACH transmission);

time unit of control link. For example, the time unit related/corresponding to control link;

time unit of backhaul link. For example, the time unit related/corresponding to the (transmission of) backhaul link. For example, the time unit (of time resources) related to/associated with the access link corresponding to/associated with (transmission of) backhaul link;

time unit of NCR-Fwd. For example, the time unit (of time resources) related to/associated with the access link corresponding to/associated with (transmission of) backhaul link of NCR-Fwd.

This method avoids the problems caused by the transmission of control link and backhaul link by NCR in the same time domain resources or time domain resources that close to each other in time, and improves the reliability of communication system. For example, NCR gives priority to transmitting control link (relative to backhaul link), which improves the reliability of control link of NCR.

Example 1G-3

When at least one of the following conditions is met, NCR does not transmit (or transmit uplink signal/channel) on the control link:

- NCR supports simultaneous uplink transmission of backhaul link and control link, or NCR does not support simultaneous uplink transmission of backhaul link and control link, or NCR only supports time division multiplexing uplink transmission of backhaul link and control link;

When the gap between the uplink signal/channel of the transmission of the control link and the backhaul link is less than a predefined value (for example, 2 symbols or 4 symbols). For example, when the gap between the first time unit of the uplink signal/channel (or uplink signal/channel transmission) of the control link (in the first time slot) and the last time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (μ). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4;

When the gap between the uplink signal/channel of the transmission of the control link and the backhaul link is less than a predefined value (for example, 2 symbols or 4 symbols). For example, when the gap between the last time unit of the uplink signal/channel (or uplink signal/channel transmission) of the control link (in the first time slot) and the first time unit of the backhaul link transmission (or time resources associated with the backhaul link) (in the second time slot) is less than a predefined value (for example, N time units). Optionally, N is a positive integer (for example, one of 1, 2, 3 and 4). Optionally, N is related to subcarrier spacing/subcarrier spacing configuration (y). For example, when μ=0 or μ=1 (that is, the subcarrier spacing is 15 kHz or 30 kHz), N=2. For example, when μ=2 or μ=3 (that is, the subcarrier spacing is 60 kHz or 120 kHz), N=4.

Optionally, the subcarrier spacing/subcarrier spacing configuration (y) may be at least one of the following:

- subcarrier spacing, or subcarrier spacing configuration of an uplink signal/channel. For example, the subcarrier spacing, or the subcarrier spacing configuration of the uplink bandwidth part (BWP) of (with) the PRACH;
- subcarrier spacing, or, subcarrier spacing configuration of (related to) the control link. For example, the subcarrier spacing, or the subcarrier spacing configuration associated with/corresponding to the transmission of the control link;
- subcarrier spacing, or the subcarrier spacing configuration of (related to) the backhaul link. For example, the subcarrier spacing, or the subcarrier spacing configuration of the time resources associated with or corresponding to the transmission of the backhaul link (corresponding access link). For example, the subcarrier spacing, or the subcarrier spacing configuration of the time resource associated with or corresponding to the transmission of the control link;
- subcarrier spacing, or subcarrier spacing configuration of (related to) NCR-Fwd. For example, the subcarrier spacing, or the subcarrier spacing configuration of the time resources associated with or corresponding to the access link (associated with the transmission of the control link) of NCR-Fwd;
- minimum/maximum subcarrier spacing (configuration) among subcarrier spacing (configuration) of (related to) an uplink signal/channel and subcarrier spacing (configuration) of (related to) backhaul link;
- minimum/maximum subcarrier spacing (configuration) among subcarrier spacing (configuration) of (related to) control link and subcarrier spacing (configuration) of (related to) backhaul link;
- minimum/maximum subcarrier spacing (configuration) among subcarrier spacing (configuration) of (related to) an uplink signal/channel and subcarrier spacing (configuration) of (related to) NCR-Fwd;
- minimum/maximum subcarrier spacing (configuration) among subcarrier spacing (configuration) of (related to) control link and subcarrier spacing (configuration) of (related to) NCR-Fwd.

Optionally, the uplink signal/channel may be at least one of PRACH, PUSCH, PUCCH and SRS. Take the uplink signal/channel being PRACH as an example.

Optionally, the time unit may be a time unit that refers to at least one of the following:

- time unit of PRACH (or PRACH transmission);
- time unit of control link. For example, the time unit related/corresponding to control link;
- time unit of backhaul link. For example, the time unit related/corresponding to the (transmission of) backhaul link. For example, the time unit (of time resources) related to/associated with the access link corresponding to/associated with (transmission of) backhaul link;
- time unit of NCR-Fwd. For example, the time unit (of time resources) related to/associated with the access link corresponding to/associated with (transmission of) backhaul link of NCR-Fwd.

This method avoids the problems caused by the transmission of control link and backhaul link by NCR in the same time domain resources or time domain resources that close to each other in time, and improves the reliability of communication system. For example, NCR gives priority to transmitting the backhaul link (relative to the control link), which improves the reliability of the backhaul link of NCR.

Embodiment 2 (indicate NCR-Fwd off, and NCR-Fwd not apply the on indication).

Figure 7:
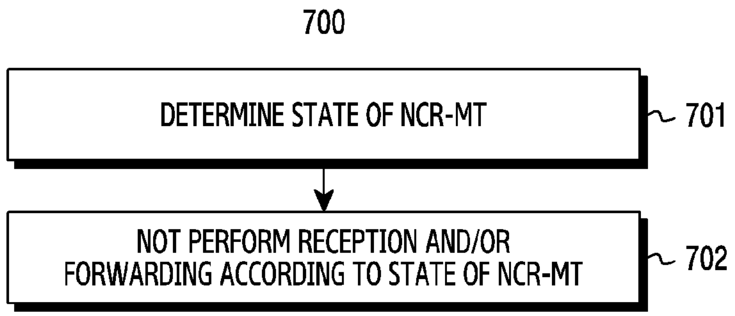
FIG. 7 illustrates another method 700 performed by an NCR according to various embodiments of the present disclosure.

FIG. 7 illustrates another method 700 performed by the NCR according to various embodiments of the present disclosure. As shown in FIG. 7, at 701, the NCR-MT determines the state of the NCR-MT (which can be understood as the NCR-MT determining the behaviors of the NCR-MT); at 702, the NCR-Fwd does not perform reception and/or forwarding according to the state (or behaviors) of the NCR-MT.

Optionally, the method includes that when the NCR satisfies at least one of the following conditions, the NCR-Fwd does not perform reception and/or forwarding, or the NCR does not apply information indicating the on off NCR-Fwd: the NCR-MT completes random access procedure; the NCR-MT receives BFR feedback; the NCR-MT receives beam indication information; the NCR-MT receives power information; the NCR-MT receives network energy saving information.

The NCR-Fwd not performing reception and/or forwarding, can be understood as that the NCR-Fwd is turned off, or that the NCR-Fwd is in off state. Optionally, the NCR not applying information indicating the on of the NCR-Fwd, can be understood as that the NCR-Fwd does not use/apply information indicating NCR-Fwd to perform reception and/or forwarding. Optionally, reception and/or forwarding refers to at least one of the following: downlink reception and/or downlink forwarding; uplink reception and/or uplink forwarding.

The above conditions and the corresponding specific behaviors of the NCR are further described in the following examples.

Example 1 (Random Access Procedure)

When NCR-MT completes random access procedure, the NCR-Fwd does not perform reception and/or forwarding, or the NCR does not apply the information indicating the on of NCR-Fwd.

Here, random access procedure refers to at least one of the following: an initial access procedure; contention based random access procedure; contention-free random access procedure; random access procedure for beam failure recovery; random access procedure initiated by the reconfiguration with synchronization process.

When the NCR-MT completes random access procedure, the NCR (or the NCR-Fwd) is turned off (or the NCR-Fwd does not perform at least one of downlink reception, downlink forwarding, downlink reception and downlink forwarding).

The above description can also be understood as follows: after the NCR-MT completes the random access procedure, the NCR (or the NCR-Fwd) does not apply or use the information indicating the NCR-Fwd to perform reception and/or forwarding. Optionally, the information refers to the periodic turn-on information of the NCR-Fwd (in other words, information indicating to perform reception and/or forwarding on the periodic time domain resources of the NCR-Fwd).

Optionally, after the NCR-MT completes the random access procedure, refers to after the NCR-MT receives the PDCCH, wherein the PDCCH is used to determine the end of the random procedure (for example, BFR feedback). Here, refer to Embodiment 1 for the explanation of BFR feedback.

Optionally, after the NCR-MT completes the random access procedure, refers to a period of time after the NCR-MT receives the PDC; wherein, the PDCCH is used for determining the end of the random process. Optionally, the period of time is, for example, 28 symbols.

Example 2 (BFR Request)

When the NCR-MT sends a BFR request, the NCR-Fwd does not perform reception and/or forwarding, or the NCR does not apply the information indicating the on of NCR-Fwd.

Here, after the NCR-MT sends the BFR request, can be understood as a time period of time (for example, 28 symbols) after the NCR-MT sends the BFR request. Optionally, the BFR request refers to at least one of the following:

PRACH (or PRACH Transmission)

Optionally, the transmission resources corresponding to the PRACH is BFR dedicated resources. Specifically, the PRACH transmission is configured through the parameter PRACH-ResourceDedicatedBFR.

PUCCH (or PUCCH Transmission)

Optionally, the PUCCH transmission is a scheduling request. Optionally, the PUCCH transmission carries a link recovery request (LLR). The PUCCH transmission is configured through the parameter schedulingRequestID-BFR-SCell.

PUSCH (or PUSCH Transmission)

Optionally, the PUSCH carries BFR MAC CE.

BFR MAC CE

Optionally, the BFR MAC CE is carried by one of the following: PUSCH, Msg3, and Message A (MsgA).

When NCR-MT sends a BFR request, the NCR (or the NCR-Fwd) is turned off (or the NCR-Fwd does not perform at least one of downlink reception, downlink forwarding, downlink reception and downlink forwarding).

The above description can also be understood as follows: after the NCR-MT sends a BFR request, the NCR (or the NCR-Fwd) does not apply or use the information indicating the NCR-Fwd to perform reception and/or forwarding. Optionally, the information refers to the periodic on information of the NCR-Fwd (in other words, information indicating reception and/or forwarding on the periodic time domain resources of the NCR-Fwd).

Example 3 (Beam Indication Information)

When the NCR-MT receives the beam indication information, the NCR-Fwd does not perform reception and/or forwarding on the time domain resources related to the beam indication information, or the NCR does not apply the information indicating the on of NCR-Fwd.

Optionally, the signaling carrying the beam indication information may be one of DCI, MAC-CE and RRC. Optionally, the signaling carrying the beam indication information is initial configuration signaling or initial indication signaling. Optionally, the beam indication information refers to at least one of reference signal indication information, TCI indication information and beam ID indication information. Optionally, the beam indication information can be understood as beam deactivation information. Optionally, the beam indication information refers to at least one of the following:

beam indication information for signal and/or channel reception by the NCR-MT of the NCR;

Optionally, the beam indication information refers to TCI state information or reference signal information.

Optionally, the signal and/or channel refers to at least one of the following:

a downlink signal and/or channel

PDCCH (or CORESET)

PDSCH

CSI-RS

SSB

An uplink signal and/or channel

PUCCH

PUSCH

SRS beam indication information for the NCR-Fwd of the NCR to perform downlink reception and/or uplink forwarding;

Optionally, the beam indication information is at least one of TCI ID, reference signal ID and SRI. The reference signal refers to at least one of SSB, CSI-RS and SRS.

beam indication information for the NCR-Fwd of the NCR to perform downlink forwarding and/or uplink reception;

Optionally, the beam indication information is at least one of TCI ID, reference signal ID, SRI and beam ID. The reference signal refers to at least one of SSB, CSI-RS and SRS.

beam indication information for indicating QCL relationship;

Optionally, the beam indication information indicates one or more reference signals (for example, SSB and/or CSI-RS). Wherein the one or more reference signals have the same QCL assumption; in other words, the NCR-MT determines that one or more reference signals are QCLed.

Optionally, the beam indication information indicates one or more reference signals (for example, SSB and/or CSI-RS). Wherein at least one of the one or more reference signals and a first reference signal have the same QCL assumption; in other words, the NCR-MT determines that the at least one of the one or more reference signals and the first reference signal are QCLed.

Optionally, the first reference signal is SSB; wherein, the SSB is related to CORESET #0. For example, the SSB is determined by the NCR-MT during random access procedure. As another example, the SSB is indicated by the MAC-CE from the base station. For another example, the SSB is determined by the NCR-MT during the beam failure recovery procedure (in other words, the link recovery procedure).

beam indication information for the NCR-Fwd beam sweeping of the NCR;

Optionally, the NCR-Fwd beam sweeping refers to UE side beam sweeping.

Optionally, the NCR-Fwd beam sweeping refers to the beam sweeping for the access link.

Optionally, the beam indication information indicates one or more reference signals; wherein, the one or more reference signals are used for the NCR-Fwd beam sweeping.

Optionally, after the NCR-MT receives the beam indication information, can be understood as a period of time (for example, 28 symbols) after the NCR-MT receives the beam indication information. In this case, the NCR-Fwd performs at least one of the following two methods:

Method 1

The NCR-Fwd does not perform reception and/or forwarding on the time domain resources corresponding to the beam indication information. Optionally, the time domain resources corresponding to the beam indication information refer to at least one of the following: time domain resources with periodicity; time domain resources for the reference signal associated with beam indication information; time domain resources on which the beam indication information is applied (or time domain resources on which the NCR-Fwd applies the beam indication information for reception and/or forwarding). Optionally, the time domain resources for the reference signal refer to at least one of the following: the time units where the reference signal is located; the time units before the time units where the reference signal is located; the time units after the time units where the reference signal is located.

Method 2

The NCR-Fwd does not apply the information indicating the on of NCR-Fwd. Optionally, the on information of the NCR-Fwd is related to the beam indication information. Optionally, the information refers to the periodic turn-on information of the NCR-Fwd (in other words, information indicating reception and/or forwarding on the time domain resources with periodicity of the NCR-Fwd). Optionally, the time domain resources with periodicity correspond to the beam indication information. In other words, the information that the NCR-Fwd is turned on indicates that the NCR-Fwd uses/applies the beam indication information (or uses/applies the spatial filter associated with the beam indication information) to perform reception and/or transmission on the time domain resources with periodicity.

Optionally, the time domain resources refer to at least one of the following: the time domain resources for the reference signal associated with the beam indication information; time domain resources on which the beam indication information is applied (or time domain resources on which the NCR-Fwd applies the beam indication information for reception and/or forwarding). Optionally, the time domain resources for the reference signal refers to at least one of the following: the time units where the reference signal is located; the time units before the time units where the reference signal is located; the time units after the time units where the reference signal is located.

Optionally, before the NCR-MT receives the beam indication information, the NCR-Fwd does not perform reception and/or forwarding. Here, refer to the above for the explanation of the beam indication information. The NCR-Fwd not performing reception and/or forwarding, can be understood as that the NCR-Fwd is turned off (or in off state).

Example 4 (Power Information)

When the NCR-MT receives the power information, the NCR-Fwd does not perform reception and/or forwarding on the time domain resources related to the power information, or the NCR does not apply the information indicating the on of NCR-Fwd.

Optionally, the time domain resources related to the power information refer to the time domain resources for the reference signal related to the power information.

Optionally, the power information refers to the amplification gain, for example, the amplification gain of the NCR-Fwd. Optionally, the amplification gain is the minimum value (in other words, the amplification gain is 0). Optionally, the amplification gain information corresponds to the smallest index (in other words, the output power corresponding to the amplification gain information of the NCR-Fwd is 0). For example, the power information includes the amplification gain used by the NCR-Fwd. Wherein the amplification gain corresponds to the minimum index. After receiving the power information, the NCR-Fwd does not perform reception and/or forwarding (e.g., downlink reception and/or downlink forwarding. For another example, uplink reception and/or uplink forwarding). For another example, the power information includes the amplification gain used by the NCR-Fwd and the corresponding application time of the amplification gain. Wherein the amplification gain corresponds to the minimum index. In this case, the NCR-Fwd does not perform reception and/or forwarding (e.g., downlink reception and/or downlink forwarding. For another example, uplink reception and/or uplink forwarding) during this application time.

Optionally, the power information is related to a reference signal. Optionally, the power information refers to the amplification gain adopted (or used) by the NCR-Fwd when using the spatial filter related to the reference signal. For example, the power information includes the amplification gain used by the NCR-Fwd and the reference signal corresponding to the amplification gain. Wherein the amplification gain corresponds to the minimum index. In this case, the NCR-Fwd does not perform reception and/or forwarding (for example, downlink reception and/or downlink forwarding. For another example, uplink reception and/or uplink forwarding) on the time domain resources related to the reference signal (for example, the time domain unit where the reference signal is located).

Optionally, the reference signal refers to one or more reference signals.

Optionally, the information that the NCR-Fwd is turned on refers to the periodic turn-on information of the NCR-Fwd (in other words, the information indicating to perform reception and/or forwarding on the periodic time domain resources by the NCR-Fwd). For example, the power information includes the amplification gain used by the NCR-Fwd. The amplification gain corresponds to the minimum index (in other words, the amplification gain is 0). After receiving the power information, the NCR-Fwd does not apply/use the information indicating turn-on of the NCR-Fwd. For another example, the power information includes the amplification gain used by the NCR-Fwd and the corresponding application time of the amplification gain. Wherein the amplification gain corresponds to the minimum index. In this case, the NCR-Fwd does not apply/use the information indicating the on of the NCR-Fwd during this application time.

Example 5 (Network Energy Saving Information, Time Domain)

The NCR-MT receives network energy saving information. Here, the network can be understood as a network device. Optionally, the network energy saving information refers to at least one of the following:

network state information

Optionally, the information indicates the state of the network, for example, on state, off state, normal state and sleep state.

network mode information

Optionally, the information indicates the mode in which the network is, for example, on mode, off mode, normal mode and sleep mode.

network on-off information

Optionally, the information indicates the on-off situation of the network, for example, on, off.

The NCR-Fwd does not perform reception and/or forwarding, or the NCR does not apply the information indicating the on of the NCR-Fwd, on the second resources or a part of the second time domain resources related to the network energy saving information. Optionally, the NCR does not apply the information indicating the on of the NCR-Fwd, on the second resources or on a part of the second time domain resources related to the network energy saving information. Optionally, the information that the NCR-Fwd is turned on refers to the periodic turn-on information of the NCR-Fwd (in other words, the information indicating to perform reception and/or forwarding on the periodic time domain resources by the NCR-Fwd).

Here, the second resources related to the network energy saving information refers to the time domain resources related to the network energy saving information. Taking the network energy saving information being normal mode or sleep mode as an example, the first time domain resources are the time domain resources in normal mode (in other words, the network device is in normal mode on the first time domain resources); the second time domain resources are time domain resources in sleep mode (in other words, the network device is in sleep mode at the second time domain resources).

Optionally, the NCR-Fwd not performing reception and/or forwarding on the second time domain resources or a part of the second time domain resources means at least one of the following: the NCR-Fwd does not perform reception and/or forwarding downlink on the second time domain resources or a part of the second time domain resources; the NCR-Fwd does not perform uplink reception and/or uplink forwarding on the second time domain resources or a part of the second time domain resources.

In addition, network energy saving information can be divided into uplink network energy saving information and downlink network energy saving information. Taking the network energy saving information being normal mode or sleep mode as an example, the normal mode can be further divided into: downlink normal mode and uplink normal mode; the sleep mode can be further divided into downlink sleep mode and uplink sleep mode. Optionally, the first uplink time domain resources are time domain resources in the uplink normal mode (in other words, the network device is in the uplink normal mode on the first uplink time domain resources). Optionally, the first downlink time domain resources are time domain resources in the downlink normal mode (in other words, the network device is in the downlink normal mode on the first downlink time domain resources). Optionally, the second uplink time domain resources are time domain resources in the uplink sleep mode (in other words, the network device is in the uplink sleep mode on the second uplink time domain resources). Optionally, the second downlink time domain resources are time domain resources in the downlink sleep mode (in other words, the network device is in the downlink sleep mode on the second downlink time domain resources). Optionally, the NCR-Fwd not performing reception and/or forwarding on the second time domain resources or a part of the second time domain resources, means at least one of the following: the NCR-Fwd does not perform downlink reception and/or downlink forwarding on the second downlink time domain resources or a part of the second downlink time domain resources; the NCR-Fwd does not perform uplink reception and/or uplink forwarding on the second uplink time domain resources or a part of the second uplink time domain resources.

Optionally, the NCR-MT does not receive and/or transmit a signal and/or channel on the second time resources.

Optionally, the NCR-MT does not receive a signal and/or channel on the second downlink time resources.

Optionally, the NCR-MT does not transmit a signal and/or channel on the second uplink time resources.

Optionally, the signal and/or channel refers to at least one of PDSCH, PDCCH, CSI-RS, SSB, PUSCH, PUCCH, SRS and PRACH.

Optionally, the signal and/or channel is periodic.

Optionally, the signal and/or channel is semi-persistent.

Example 6 (Network Energy Saving Information, Frequency Domain)

The NCR-MT receives network energy saving information. Here, the network can be understood as a network device. See Example 6 for the explanation of network energy saving information.

The NCR-Fwd does not perform reception and/or forwarding, or the NCR does not apply the information indicating the on of the NCR-Fwd, on the second resources or a part of the second time domain resources related to the network energy saving information. Optionally, the NCR does not apply the information indicating the on of the NCR-Fwd, on the second resources related to the network energy saving information or on a part of the second time domain resources. Optionally, the information that the NCR-Fwd is turned on refers to the periodic turn-on information of the NCR-Fwd (in other words, the information indicating the reception and/or forwarding on the periodic time domain resources by the NCR-Fwd).

Here, the second resources related to the network energy saving information refer to the frequency domain resources related to the network energy saving information. Taking the network energy saving information being normal mode or sleep mode as an example, the first frequency domain resources are the frequency domain resources in normal mode (in other words, the network device is in normal mode on the first frequency domain resources); the second frequency domain resources are the frequency domain resources in sleep mode (in other words, the network device is in the sleep mode on the second frequency domain resources).

Optionally, the NCR-Fwd performing reception and/or forwarding on the second frequency domain resources or a part of the second frequency domain resources means at least one of the following: the NCR-Fwd does not perform reception and/or forwarding downlink on the second frequency domain resources or a part of the second frequency domain resources; the NCR-Fwd does not perform uplink reception and/or uplink forwarding on the second frequency domain resources or a part of the second frequency domain resources.

In addition, network energy saving information can be divided into uplink network energy saving information and downlink network energy saving information. Taking the network energy saving information being normal mode or sleep mode as an example, the normal mode can be further divided into: downlink normal mode and uplink normal mode; the sleep mode can be further divided into downlink sleep mode and uplink sleep mode. Optionally, the third frequency domain resources are frequency domain resources in the uplink normal mode (in other words, the network device is in the uplink normal mode on the third frequency domain resources). Optionally, the fourth frequency domain resources are frequency domain resources in the downlink normal mode (in other words, the network device is in the downlink normal mode on the fourth frequency domain resources). Optionally, the fifth frequency domain resources are frequency domain resources in the uplink sleep mode (in other words, the network device is in the uplink sleep mode on the fifth frequency domain resources). Optionally, the sixth frequency domain resources are frequency domain resources in the downlink sleep mode (in other words, the network device is in the downlink sleep mode on the sixth frequency domain resources). Optionally, the NCR-Fwd performing reception and/or forwarding on frequency domain resources means at least one of the following: the NCR-Fwd does not perform uplink reception and/or uplink forwarding on the fifth frequency domain resources or a part of the fifth frequency domain resources; the NCR-Fwd does not perform downlink reception and/or downlink forwarding on the sixth frequency domain resources or a part of the sixth frequency domain resources.

Optionally, the NCR-MT does not receive and/or transmit a signal and/or channel on the second frequency domain resources.

Optionally, the NCR-MT does not receive a signal and/or channel on the sixth frequency domain resources.

Optionally, the NCR-MT does not transmit a signal and/or channel on the fifth frequency domain resources.

Optionally, the frequency domain resources refer to at least one of RB, RB group, BWP, CC, cell, subband, frequency band and frequency range.

Optionally, the signal and/or channel refers to at least one of PDSCH, PDCCH, CSI-RS, SSB, PUSCH, PUCCH, SRS and PRACH.

Optionally, the signal and/or channel is periodic.

Optionally, the signal and/or channel is semi-persistent.

Example 7 (Network Energy Saving Information, Space Domain Information)

NCR-MT receives network energy saving information. Here, the network can be understood as a network device. See Example 6 for the explanation of network energy saving information.

NCR-Fwd does not perform reception and/or forwarding, or the NCR does not apply the information indicating the on of the NCR-Fwd according to the spatial information related to the network energy saving information. Taking the spatial information being reference signal information as an example, the NCR receives the network energy saving information, which indicates that a reference signal is in the RS muted state or stops transmitting. After receiving the network energy saving information, the NCR does not apply the NCR-Fwd on indication related to the reference signal. Specifically, the NCR-Fwd on indication related to the reference signal refers to indication that the NCR-Fwd applies the reference signal on a time domain resource for reception and/or forwarding. Optionally, the information indicating the on of the NCR-Fwd is related to the space domain information. Optionally, the information indicating the on of the NCR-Fwd refers to the periodic turn-on information of the NCR-Fwd (in other words, information indicating to perform reception and/or forwarding on the periodic time domain resources of the NCR-Fwd). Here, the spatial information can be understood as beam indication information, reference signal information, antenna port information, antenna panel information, TRP information and the like.

Taking the spatial information being reference information as an example, Optionally, the NCR-Fwd does not perform reception and/or forwarding on the time domain resources related to the reference signal information related to the network energy saving information. Here, taking the network energy saving information in normal mode or sleep mode as an example, the first time domain resources are the time domain resources in normal mode (in other words, the network device is in normal mode on the first time domain resources), corresponds to the first space domain information (first reference signal information). The second time domain resources are the time domain resources in sleep mode (in other words, the network device is in sleep mode on the second time domain resources), and corresponds to the second spatial information (second reference signal information). Optionally, the NCR-Fwd does not perform reception and/or forwarding on the time domain resources related to the second reference signal information (in other words, the NCR ignores the time domain resources indication related to the second reference signal information).

Optionally, the time domain resources related to the second reference signal information refers to the time domain resources where the second reference signal information is applied (in other words, the NCR-Fwd performs reception and/or forwarding on the time domain resources according to the spatial filter corresponding to the second reference signal information).

Optionally, the time domain resources related to the second reference signal information refers to the time domain units where the reference signal corresponding to the second reference signal information is located.

Optionally, the NCR-Fwd determines a spatial filter that is not used for downlink reception and/or uplink forwarding according to the second spatial information. Optionally, the NCR-Fwd determines a spatial filter for downlink reception and/or uplink forwarding on second time domain resources according to the second spatial information.

Optionally, the NCR-Fwd determines a spatial filter that is not used for uplink reception and/or downlink forwarding according to the second spatial information. Optionally, the NCR-Fwd determines a spatial filter for downlink reception and/or uplink forwarding on second time domain resources according to the second spatial information.

Optionally, the NCR-Fwd determines the reference signal according to the second spatial information; wherein, the NCR-Fwd performs reception and/or forwarding on the time domain resources related to the reference signal. Optionally, the NCR-Fwd determines the second reference signal according to the second spatial information; wherein, the NCR-Fwd does not perform reception and/or forwarding on the time domain resources related to the second reference signal. Taking the second space domain information being the reference signal information (or SSB information) as an example, the NCR obtains SSB information (for example, SSB #0, SSB #1, SSB #2, SSB #3) from the base station. This SSB information can be understood as being used for UE-side beam indication for the NCR-Fwd. In other words, the NCR-Fwd uses the same QCL assumption to receive these SSBs. In other words, such SSB information indicates the NCR-Fwd to perform downlink reception and/or downlink forwarding on the time domain resources corresponding to these SSBs. In addition, the NCR also receives second space domain information, which corresponds to second SSB information (for example, SSB #0, SSB #2, SSB #4, SSB #6). Optionally, the NCR-Fwd does not perform downlink reception and/or downlink forwarding on the time domain resources corresponding to SSBs determined according to the intersection (SSB #0, SSB #2) of SSB information (SSB #0, SSB #1, SSB #2, SSB #3) and second SSB information (SSB #0, SSB #2, SSB #4, SSB #6). Optionally, the NCR-Fwd does not perform uplink reception and/or uplink forwarding on the time domain resources related to the PRACH occasions associated with the above SSB intersection (SSB #0, SSB #2).

Optionally, the NCR-MT does not receive and/or transmit a signal and/or channel according to the spatial information. Taking spatial information being reference signal information as an example, the NCR-MT does not receive and/or transmit a signal and/or channel according to the reference signal information. Optionally, the signal and/or channel is related to reference signal information. For example, the reference signal corresponds to reference signal information. For another example, the reference signal corresponding to the reference signal information and the signal and/or channel are QCLed.

Advantageous effects of Embodiment 2: Embodiment 2 provides a method in which NCR-Fwd does not perform reception and/or forwarding or does not perform NCR-Fwd turn-on indication. The method can indicate the NCR-Fwd not to perform reception and/or forwarding, so that the base station can control the NCR-Fwd to turn off, and avoid the waste of energy or unnecessary interference caused by turning on the NCR-Fwd at an inappropriate time (for example, when gNB and UE are not communicating), thereby reducing the power consumption of the NCR-Fwd and further improving the performance of the communication system.

Figure 8:
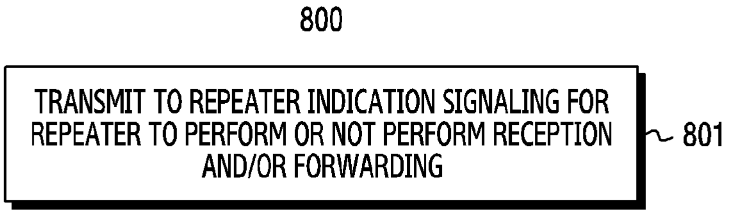
FIG. 8 illustrates a method 800 performed by a base station according to various embodiments of the present disclosure.

FIG. 8 illustrates a method 800 performed by a base station according to various embodiments of the present disclosure. As shown in FIG. 8, at 801, indication signaling is sent to a repeater, and the indication signaling is used for the repeater to perform or not perform reception and/or transmission.

Figure 9:
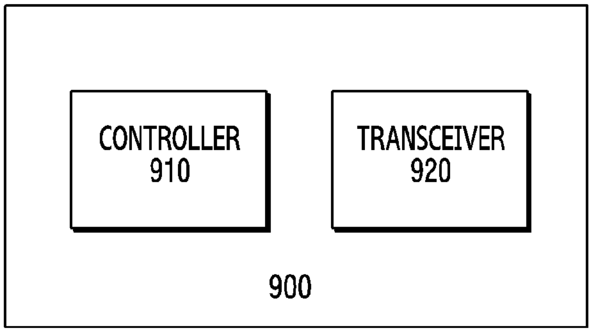
FIG. 9 illustrates a structure 900 of a base station according to various embodiments of the present disclosure.

The mobile terminal NCR-MT and NCR-Fwd of a repeater (NCR) shown in FIG. 5 are respectively configured to perform the corresponding methods disclosed herein. FIG. 9 illustrates a structure 900 of a base station according to various embodiments of the present disclosure. As shown in FIG. 9, the base station 900 includes a controller 910 and a transceiver 920, wherein the controller 910 is configured to perform the method described in FIG. 8 above, and the transceiver 920 is configured to transceive data or signals.

Figure 10:
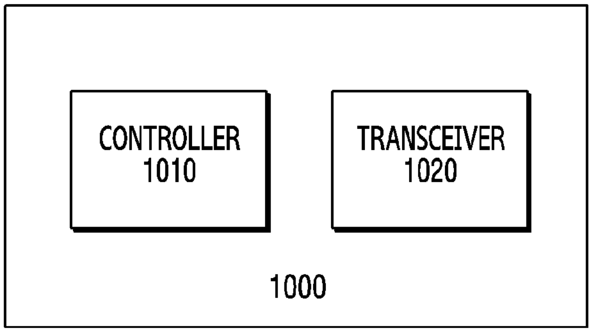
FIG. 10 illustrates another structure 1000 of a repeater according to various embodiments of the present disclosure.

FIG. 10 illustrates another structure 1000 of a repeater according to various embodiments of the present disclosure. As shown in FIG. 10, the repeater 1000 includes a controller 1010 and a transceiver 1020, wherein the controller 1010 is configured to perform the corresponding method disclosed herein, and the transceiver 1020 is configured to transceive data or signals.

According to an embodiment of the present disclosure, a method performed by a repeater comprising a mobile terminal and a forwarder, the method comprising: the mobile terminal performs at least one of the following behaviors: the mobile terminal determines resources based on a state of the mobile terminal, and the repeater performs reception and/or forwarding based on the resources; the mobile terminal receives information indicating the repeater to turn off, and the mobile terminal does not apply the information based on the state of the mobile terminal, wherein the state of the mobile terminal includes at least one of: the mobile terminal entering or being in a radio resources control RRC connected state; the mobile terminal completing random access procedure; the mobile terminal receiving beam failure recovery BFR feedback.

Furthermore, the repeater performing reception and/or forwarding based on the resources, comprises: the repeater performing reception and/or forwarding on first time domain resources, wherein the first time domain resources include at least one of the following: time domain resources for a reference signal; time domain resources for common channels and/or common signals; time domain resources after common channels and/or common signals; time domain resources for physical random access channel PRACH; time domain resources related to random access response RAR window; time domain resources related to slot format information.

Furthermore, the random access procedure comprises at least one of the following: initial access procedure; random access procedure for beam failure recovery: random access procedure initiated by the reconfiguration with sync procedure.

According to an embodiment of the present disclosure, a method performed by a repeater, the repeater including a mobile terminal and a repeater, the method comprising: the mobile terminal receives a first signal and/or channel, the mobile terminal performs at least one of the following behaviors: the repeater performs reception and/or forwarding based on resources associated with the first signal and/or channel; the mobile terminal receives information indicating the repeater to turn off, and the mobile terminal does not apply the information based on the first signal and/or channel; wherein the first signal and/or channel comprises at least one of: beam indication information; power information; network energy saving information.

Furthermore, the repeater performing reception and/or forwarding based on resources associated with the first signal and/or channel, comprises: the repeater performing reception and/or forwarding on the time domain resources associated with beam indication information.

Furthermore, the repeater performing reception and/or forwarding based on resources associated with the first signal and/or channel, comprises: the repeater performing reception and/or forwarding on the time domain resources for a reference signal associated with the power information.

Furthermore, the repeater performing reception and/or forwarding based on resources associated with the first signal and/or channel, comprises: the repeater performs reception and/or forwarding on first resources or a part of the first resources associated with the network energy saving information, and the method further comprises: the mobile terminal receives and/or transmits a signal and/or channel on the first resources.

Furthermore, the repeater performing reception and/or forwarding based on resources associated with the first signal and/or channel, comprises: the repeater performs reception and/or forwarding according to the spatial information associated with the network energy saving information, and the method further comprises: the mobile terminal receives and/or transmits a signal and/or channel according to the spatial information.

Furthermore, the beam indication information is carried through initial configuration signaling or initial indication signaling, and includes at least one of: beam indication information for the repeater to perform downlink reception and/or uplink forwarding; beam indication information for the repeater to perform downlink forwarding and/or uplink reception; beam indication information for indicating quasi-co-address QCL relationship; beam indication information for the repeater to perform beam sweeping.

Furthermore, the power information includes an amplification gain of the mobile terminal.

Furthermore, the network energy saving information comprises at least one of: network state information; network mode information; network on-off information.

According to an embodiment of the present disclosure, a method performed by a repeater including a mobile terminal and a repeater, the method comprising: the mobile terminal performs at least one of the following behaviors: the mobile terminal determines resources based on a state of the mobile terminal, and the repeater does not perform reception and/or forwarding based on the resources; the mobile terminal receives information indicating the repeater to turn on, and the mobile terminal does not apply the information based on the state of the mobile terminal, wherein the state of the mobile terminal includes at least one of: the mobile terminal completing random access procedure; the mobile terminal receiving beam failure recovery BFR feedback.

Furthermore, the random access procedure comprises at least one of the following: initial access process; random access procedure for beam failure recovery: random access procedure initiated by the reconfiguration with sync procedure.

According to an embodiment of the present disclosure, a method performed by a repeater including a mobile terminal and a repeater, the method comprising: the mobile terminal receives a first signal and/or channel; the mobile terminal performs at least one of the following behaviors: the repeater does not perform reception and/or forwarding based on resources associated with the first signal and/or channel; the mobile terminal receives information indicating the repeater to turn on, and the mobile terminal does not apply the information based on the first signal and/or channel, wherein the first signal and/or channel comprises at least one of: beam indication information; power information; network energy saving information.

Furthermore, the repeater not performing reception and/or forwarding based on the resources associated with the first signal and/or channel comprises: the repeater not performing reception and/or forwarding on the time domain resources associated with the beam indication information.

According to an embodiment of the present disclosure, a method performed by a Network-Controlled Repeater (NCR) in a wireless communication system, the method comprising: receiving, from a base station, side control information including configuration information for forwarding signals between the base station and a user equipment (UE), wherein the configuration information includes information on beam indication for the forwarding to the UE; and forwarding the signals between the base station and the UE based on the information on the beam indication, in case that a random access procedure triggered by beam failure recovery, for a mobile termination (MT) of the NCR, is completed.

Furthermore, the side control information is received by the MT of the NCR, and forwarding (Fwd) of the NCR is controlled based on the side control information.

Furthermore, the configuration information is configured via a radio resource control (RRC) layer.

Furthermore, further comprising: receiving, from the base station, by the MT of the NCR, information on time domain resources, wherein the forwarding the signals comprising: forwarding, by the fwd of the NCR, signals for a downlink on an access link based on the time domain resource, or forwarding by the fwd of the NCR signals for an uplink on a backhaul link based on the time domain resource.

Furthermore, the backhaul link is between the base station and the NCR, and the access link is between the NCR and the UE.

According to an embodiment of the present disclosure, a Network-Controlled Repeater (NCR) in a wireless communication system, the NCR comprising: a transceiver; and at least one processor coupled with the transceiver and configured to: receive, from a base station, side control information including configuration information for forwarding signals between the base station and a user equipment (UE), wherein the configuration information includes information on beam indication for the forwarding to the UE; and forward the signals between the base station and the UE based on the information on the beam indication, in case that a random access procedure triggered by beam failure recovery, for a mobile termination (MT) of the NCR, is completed.

Furthermore, the at least one processor is further configured to: receive, from the base station, by the MT of the NCR, information on time domain resources, wherein for forwarding the signals, the at least one processor is further configured to: forward, by the fwd of the NCR, signals for a downlink on an access link based on the time domain resource, or forward, by the fwd of the NCR signals for an uplink on a backhaul link based on the time domain resource.

According to an embodiment of the present disclosure, a method performed by a base station in a wireless communication system, the method comprising: transmitting, to a Network-Controlled Repeater (NCR), side control information including configuration information for forwarding signals between the base station and a user equipment (UE), wherein the configuration information includes information on beam indication for the forwarding to the UE, and wherein the signals between the base station and the UE is forwarded based on the information on the beam indication, in case that a random access procedure triggered by beam failure recovery, for a mobile termination (MT) of the NCR, is completed; and receiving, from the NCR, the forwarded signals.

Furthermore, the side control information is transmitted to the MT of the NCR, and wherein a forwarding (Fwd) of the NCR is controlled based on the side control information.

Furthermore, the configuration information is configured via a radio resource control (RRC) layer.

Furthermore, further comprising: transmitting, to the NCR, information on time domain resources, wherein signals for a downlink is forwarded on an access link based on the time domain resource, and wherein signals for an uplink is forwarded on a backhaul link based on the time domain resource.

Furthermore, the backhaul link is between the base station and the NCR, and wherein the access link is between the NCR and the UE.

According to an embodiment of the present disclosure, a base station in a wireless communication system, the base station comprising: a transceiver; and at least one processor coupled with the transceiver and configured to: transmit, to a Network-Controlled Repeater (NCR), side control information including configuration information for forwarding signals between the base station and a user equipment (UE), wherein the configuration information includes information on beam indication for the forwarding to the UE, and wherein the signals between the base station and the UE is forwarded based on the information on the beam indication, in case that a random access procedure triggered by beam failure recovery, for a mobile termination (MT) of the NCR, is completed, and receive, from the NCR, the forwarded signals.

Furthermore, wherein the at least one processor is further configured to: transmit, to the NCR, information on time domain resources, wherein signals for a downlink is forwarded on an access link based on the time domain resource, and wherein signals for an uplink is forwarded on a backhaul link based on the time domain resource.

In this disclosure, a time unit refers to at least one of the following: a frame, a subframe, a slot, a sub-slot, and a symbol. It can be understood that a spatial resource corresponds to spatial information in the present disclosure, and the spatial resource can be understood as a resource for spatial information (e.g., a spatial filter, etc.). In addition, the term "CSS" in this disclosure can be understood as a CSS set.

It can also be understood that "at least one/at least one" described in this disclosure includes any and/or all possible combinations of listed items, various embodiments described in this disclosure and various examples in embodiments can be changed and combined in any suitable form, and "/" described in this disclosure means "and/or".

The illustrative logical blocks, modules, and circuits described in this disclosure may be implemented in a general-purpose processor, a Digital Signal Processor (DSP), an application specific integrated circuit, ASIC), Field Programmable Gate Array (FPGA) or other programmable logic devices, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors cooperating with a DSP core, or any other such configuration.

The steps of a method or algorithm described in this disclosure may be embodied directly in hardware, in a software module performed by a processor, or in a combination of the both. Software modules may reside in RAM memory, flash memory, ROM memory, EPROM memory, EEPROM memory, registers, hard disks, removable disks, or any other form of storage media known in the art. An exemplary storage medium is coupled to a processor to enable the processor to read and write information from/to the storage medium. In the alternative, the storage medium may be integrated into the processor. The processor and storage medium may reside in an ASIC. The ASIC may reside in the user terminal. In the alternative, the processor and the storage medium may reside as separate components in the user terminal.

In one or more exemplary designs, the described functions may be implemented in hardware, software, firmware, or any combination thereof. If implemented in software, each function can be stored on or transmitted by a computer-readable medium as one or more indications or codes. Computer-readable media include both computer storage media and communication media, and the latter includes any media that facilitates the transfer of computer programs from one place to another. The storage medium can be any available medium that can be accessed by a general-purpose or special-purpose computer.

The description set forth herein, taken in conjunction with the drawings, describes example configurations, methods and devices, and does not represent all examples that can be realized or are within the scope of the claims. As used herein, the term "example" means "serving as an example, instance or illustration" rather than "preferred" or "superior to other examples". The detailed description includes specific details in order to provide an understanding of the described technology. However, these techniques may be practiced without these specific details. In some cases, well-known structures and devices are shown in block diagram form to avoid obscuring the concepts of the described examples.

Although this specification contains many specific implementation details, these should not be interpreted as limitations on the scope of the claimed protection, but as descriptions of specific features of specific embodiments of the disclosure. Some features described in this specification in the context of separate embodiments can also be combined in a single embodiment. On the contrary, various features described in the context of a single embodiment can also be implemented separately in multiple embodiments or in any suitable sub-combination. Furthermore, although features may be described above as functioning in certain combinations, and even initially claimed as such, in some cases, one or more features from the claimed combination may be deleted from the combination, and the claimed combination may be directed to a subcombination or a variation of a subcombination.

It should be understood that the specific order or hierarchy of steps in the method of the present disclosure is illustrative of an exemplary process. Based on the design preference, it can be understood that the specific order or hierarchy of steps in the method can be rearranged to realize the functions and effects disclosed in the present disclosure. The appended method claims present elements of various steps in an example order, and are not meant to be limited to the particular order or hierarchy presented, unless otherwise specifically stated. Furthermore, although elements may be described or claimed in the singular, the plural is also contemplated unless the limitation on the singular is explicitly stated. Therefore, the present disclosure is not limited to the illustrated examples, and any means for performing the functions described herein are included in various aspects of the present disclosure.

Text and drawings are provided as examples only to help readers understand the present disclosure. They are not intended and should not be construed to limit the scope of the present disclosure in any way. Although certain embodiments and examples have been provided, based on the disclosure herein, it is obvious to those skilled in the art that changes can be made to the illustrated embodiments and examples without departing from the scope of this disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a Network-Controlled Repeater (NCR) in a wireless communication system, the method comprising:

receiving, from a base station, via a mobile termination (MT) of the NCR, over a beam of a control link, side control information including configuration information for forwarding of signals between the base station and a user equipment (UE), wherein the configuration information includes information on a beam indication for a link forwarding the signals to the UE;

forwarding a first signal between the base station and the UE based on the beam indication for the link forwarding the signals to the UE;

identifying that a random access procedure triggered by beam failure recovery for the MT of the NCR corresponding with a failure of the beam of the control link is completed, wherein, when the beam failure recovery is requested, a forwarding (Fwd) of the NCR does not perform the link forwarding; and as a response to the completion of the random access procedure, forwarding a second signal between the base station and the UE based on the beam indication for the link forwarding the signals to the UE.

2. The method of claim 1, wherein the side control information is received by the MT of the NCR, and wherein the Fwd of the NCR is controlled based on the side control information.

3. The method of claim 1, wherein the configuration information is configured via a radio resource control (RRC) layer.

4. The method of claim 1, further comprising:

receiving, from the base station by the MT of the NCR, information on time domain resources, wherein the forwarding the first signal or forwarding the second signal comprises:

forwarding, by a Fwd of the NCR, signals for a downlink on an access link based on the information on time domain resources, or forwarding, by the Fwd of the NCR, signals for an uplink on a backhaul link based on the information on time domain resources.

5. The method of claim 4, wherein the backhaul link is between the base station and the NCR, and wherein the access link is between the NCR and the UE.

6. A Network-Controlled Repeater (NCR) in a wireless communication system, the NCR comprising:

a transceiver; and a controller coupled with the transceiver and configured to:

receive, via a mobile termination (MT) of the NCR, over a beam of a control link, from a base station, side control information including configuration information for forwarding of signals between the base station and a user equipment (UE), wherein the configuration information includes information on a beam indication for a link forwarding the signals to the UE, forward a first signal between the base station and the UE based on the beam indication for the link forwarding the signals to the UE, identify that a random access procedure triggered by beam failure recovery for the MT of the NCR corresponding with a failure of the beam of the control link is completed, wherein, when the beam failure recovery is requested, a forwarding (Fwd) of the NCR does not perform the link forwarding, and as a response to the completion of the random access procedure, forward a second signal between the base station and the UE based on the beam indication for the link forwarding the signals to the UE.

7. The NCR of claim 6, wherein the side control information is received by the MT of the NCR, and wherein the Fwd of the NCR is controlled based on the side control information.

8. The NCR of claim 6, wherein the configuration information is configured via a radio resource control (RRC) layer.

9. The NCR of claim 6, wherein the controller is further configured to:

receive, from the base station by the MT of the NCR, information on time domain resources, wherein for forwarding the first signal or forwarding the second signal, the controller is further configured to:

forward, by a Fwd of the NCR, signals for a downlink on an access link based on the information on time domain resources, or forward, by the Fwd of the NCR, signals for an uplink on a backhaul link based on the information on time domain resources.

10. The NCR of claim 9, wherein the backhaul link is between the base station and the NCR, and wherein the access link is between the NCR and the UE.

* * * * *